United States Patent
Kameo et al.

(10) Patent No.: US 11,802,032 B2
(45) Date of Patent: Oct. 31, 2023

(54) PROCESSING DEVICE, PROCESSING METHOD, NOTIFICATION SYSTEM, AND RECORDING MEDIUM

(71) Applicant: Mitsubishi Logisnext Co., Ltd., Kyoto (JP)

(72) Inventors: Naruhisa Kameo, Tokyo (JP); Kiichi Sugimoto, Tokyo (JP); Kenta Nakao, Tokyo (JP); Satoshi Iio, Tokyo (JP); Koji Shiizaki, Kyoto (JP); Shogo Minami, Kyoto (JP)

(73) Assignee: Mitsubishi Logisnext Co., Ltd., Kyoto (JP)

( * ) Notice: Subject to any disclaimer, the term of this patent is extended or adjusted under 35 U.S.C. 154(b) by 275 days.

(21) Appl. No.: 17/179,851

(22) Filed: Feb. 19, 2021

(65) Prior Publication Data

US 2021/0261136 A1    Aug. 26, 2021

(30) Foreign Application Priority Data

Feb. 26, 2020   (JP) ................................. 2020-030842

(51) Int. Cl.
| | | |
|---|---|---|
| *B66F 9/075* | (2006.01) | |
| *B60W 40/08* | (2012.01) | |
| *B60W 50/14* | (2020.01) | |
| *H04S 7/00* | (2006.01) | |
| *G06V 20/58* | (2022.01) | |

(Continued)

(52) U.S. Cl.
CPC ........... *B66F 9/0755* (2013.01); *B60W 40/08* (2013.01); *B60W 50/14* (2013.01); *G06F 18/214* (2023.01); *G06V 20/58* (2022.01); *G06V 20/597* (2022.01); *G06V 40/103* (2022.01); *H04S 7/303* (2013.01); *B60W 2050/143* (2013.01);

(Continued)

(58) Field of Classification Search
None
See application file for complete search history.

(56) References Cited

U.S. PATENT DOCUMENTS

2011/0187844 A1    8/2011  Ogawa et al.
2016/0300485 A1*  10/2016  Ayvaci .................. G06V 20/58

(Continued)

FOREIGN PATENT DOCUMENTS

| CN | 101549648 A | 10/2009 |
|---|---|---|
| CN | 102249169 A | 11/2011 |

(Continued)

OTHER PUBLICATIONS

Espacenet English Translation of Description of JP2014059841A (Year: 2014).*

(Continued)

*Primary Examiner* — James J Lee
*Assistant Examiner* — Andrew Sang Kim
(74) *Attorney, Agent, or Firm* — Blank Rome LLP

(57) ABSTRACT

A processing device includes: a calculation unit that is configured to detect a position of an object that is a possible obstacle to a vehicle; a first detection unit that is configured to detect a direction of a line of sight of a driver of the vehicle; a decision unit that is configured to decide an aspect of an alarm on the basis of the position and the direction of the line of sight of the driver; and a control unit that is configured to control a speaker corresponding to the position such that a sound of the aspect is output.

12 Claims, 10 Drawing Sheets

| | | OUTPUT | |
|---|---|---|---|
| | | NOTIFICATION TO DRIVER | NOTIFICATION TO PERSON (OBSTACLE) |
| INPUT | WHETHER OR NOT DRIVER RECOGNIZES OBSTACLE | EMBODIMENT 1 | — |
| | WHETHER OR NOT PERSON (OBSTACLE) RECOGNIZES INDUSTRIAL VEHICLE | EMBODIMENT 2-1 | EMBODIMENT 2-2 |
| | WHETHER OR NOT PERSON (OBSTACLE) IS IN MOVABLE STATE | EMBODIMENT 3-1 | EMBODIMENT 3-2 |

(51) Int. Cl.
*G06V 20/59* (2022.01)
*G06V 40/10* (2022.01)
*G06F 18/214* (2023.01)

(52) U.S. Cl.
CPC . *B60W 2540/223* (2020.02); *B60W 2540/225* (2020.02); *B60W 2540/229* (2020.02)

(56) References Cited

U.S. PATENT DOCUMENTS

| | | | |
|---|---|---|---|
| 2019/0197738 | A1 | 6/2019 | Kishita et al. |
| 2020/0057487 | A1* | 2/2020 | Sicconi .................. G06T 7/254 |
| 2020/0398743 | A1* | 12/2020 | Huber .................... B60Q 1/50 |

FOREIGN PATENT DOCUMENTS

| | | | | |
|---|---|---|---|---|
| CN | 102298702 | A | 12/2011 | |
| CN | 107031650 | A | 8/2017 | |
| CN | 107176567 | A | 9/2017 | |
| CN | 207468161 | U | 6/2018 | |
| CN | 102992229 | A | 3/2023 | |
| EP | 3 836 119 | A1 | 6/2021 | |
| EP | 3836119 | A1 * | 6/2021 | ............ B60W 40/09 |
| JP | 2003-99899 | A | 4/2003 | |
| JP | 2006-350934 | A | 12/2006 | |
| JP | 2011-198247 | A | 10/2011 | |
| JP | 2014-059841 | A | 4/2014 | |
| JP | 2016-222428 | A | 12/2016 | |
| JP | 2017-224165 | A | 12/2017 | |
| JP | 2018-156176 | A | 10/2018 | |
| JP | 2019-171901 | A | 10/2019 | |
| JP | 6589734 | B2 | 10/2019 | |
| WO | WO 2010/029707 | A2 | 3/2010 | |
| WO | WO 2015/037117 | A1 | 3/2015 | |
| WO | WO 2018/042747 | A1 | 3/2018 | |
| WO | WO 2020/031695 | A1 | 2/2020 | |

OTHER PUBLICATIONS

Office Action, JP Application No. 2020-030842, dated May 24, 2022.
Office Action, JP Application No. 2020-030842, dated Nov. 1, 2022.
Search Report for European Patent Application No. 21158985.8, dated Jun. 17, 2021.
Chinese Office Action dated Aug. 7, 2023 issued in corresponding Chinese Application No. 202110197250.9.

* cited by examiner

| CASE No. | STEERING ANGLE | TRAVELING DIRECTION | VEHICLE SPEED | ACCELERATION | TIME UNTIL COLLISION | GAP |
|---|---|---|---|---|---|---|
| ... | ... | ... | ... | ... | ... | ... |
| 0 | −3deg | FORWARD | 7km/h | 0.5m/s2 | — | — (CURRENT STATE) |
| ... | ... | ... | ... | ... | ... | ... |
| 1 | 3deg | FORWARD | — | 1.5m/s2 | 3 SECONDS | 16 |
| 2 | 3deg | FORWARD | — | 0.4m/s2 | 5 SECONDS | 8 |
| 3 | 5deg | FORWARD | — | 0.3m/s2 | 5.5 SECONDS | 10 |
| ... | ... | ... | ... | ... | ... | ... |
| 4 | 14deg | FORWARD | — | −0.4m/s2 | 12 SECONDS | 26 |
| ... | ... | ... | ... | ... | ... | ... |

| | | OUTPUT | |
|---|---|---|---|
| | | NOTIFICATION TO DRIVER | NOTIFICATION TO PERSON (OBSTACLE) |
| INPUT | WHETHER OR NOT DRIVER RECOGNIZES OBSTACLE | EMBODIMENT 1 | — |
| | WHETHER OR NOT PERSON (OBSTACLE) RECOGNIZES INDUSTRIAL VEHICLE | EMBODIMENT 2-1 | EMBODIMENT 2-2 |
| | WHETHER OR NOT PERSON (OBSTACLE) IS IN MOVABLE STATE | EMBODIMENT 3-1 | EMBODIMENT 3-2 |

PROCESSING DEVICE, PROCESSING METHOD, NOTIFICATION SYSTEM, AND RECORDING MEDIUM

BACKGROUND OF THE INVENTION

Field of the Invention

The present disclosure relates to a processing device, a processing method, a notification system, and a recording medium.

Description of Related Art

Industrial vehicles, such as forklifts, have characteristics different from those of general cars, such as the steering angle of the wheels of a vehicle body and the structure of the vehicle. Therefore, especially for drivers who have little experience in driving the industrial vehicles, a region in which the industrial vehicle is actually moved when it is operated is likely to be different from the expected region, or a blind spot is likely to occur when the industrial vehicle is operated.

Japanese Unexamined Patent Application, First Publication No. 2016-222428 discloses a technique that alerts a driver when a forklift is reversed as the related art.

SUMMARY OF THE INVENTION

When an object that may be an obstacle, such as a person or luggage, is detected around a vehicle, the vehicle notifies the driver that the object has been detected, regardless of whether or not the driver recognizes the object. Then, a case is also considered in which, when the driver is notified, the driver actually recognizes the object and the degree of risk is low. In a case in which this notification is repeated, the driver may be accustomed to the notification.

Therefore, there is a demand for a technique that can notify the presence of an object around the vehicle in an aspect corresponding to the state of the driver of the vehicle.

At least one embodiment of the present disclosure has been made in view of the above-mentioned problems, and an object of the present disclosure is to provide a processing device, a processing method, a notification system, and a recording medium that can notify the presence of an object around a vehicle in an aspect corresponding to the state of the driver of the vehicle.

In order to achieve the object, according to an aspect of the present disclosure, there is provided a processing device including: a calculation unit that is configured to detect a position of an object that is a possible obstacle to a vehicle; a first detection unit that is configured to detect a direction of a line of sight of a driver of the vehicle; a decision unit that is configured to decide an aspect of an alarm on the basis of the position and the direction of the line of sight of the driver; and a control unit that is configured to control a speaker corresponding to the position such that a sound of the aspect is output.

According to another aspect of the present disclosure, there is provided a processing method including: detecting a position of an object that is a possible obstacle to a vehicle; detecting a direction of a line of sight of a driver of the vehicle; deciding an aspect of an alarm on the basis of the position and the direction of the line of sight of the driver; and controlling a speaker corresponding to the position such that a sound of the aspect is output.

According to still another aspect of the present disclosure, there is provided a non-transitory computer-readable recording medium storing a program that causes a computer to execute: detecting a position of an object that is a possible obstacle to a vehicle; detecting a direction of a line of sight of a driver of the vehicle; deciding an aspect of an alarm on the basis of the position and the direction of the line of sight of the driver; and controlling a speaker corresponding to the position such that a sound of the aspect is output.

According to the processing device, the processing method, and the recording medium of the embodiments of the present disclosure, it is possible to notify the presence of an object around a vehicle in an aspect corresponding to the state of the driver of the vehicle.

DETAILED DESCRIPTION OF THE INVENTION

First Embodiment

Hereinafter, a notification system 100 according to a first embodiment of the present disclosure will be described.
(Configuration of Notification System)

The notification system 100 includes an industrial vehicle 1 (an example of a vehicle) and a host device 2.

(Configuration of Industrial Vehicle)

The industrial vehicle 1 is a vehicle that outputs sounds of different aspects in a direction in which an object is present according to whether or not a driver is aware of the object.

Figure 1:
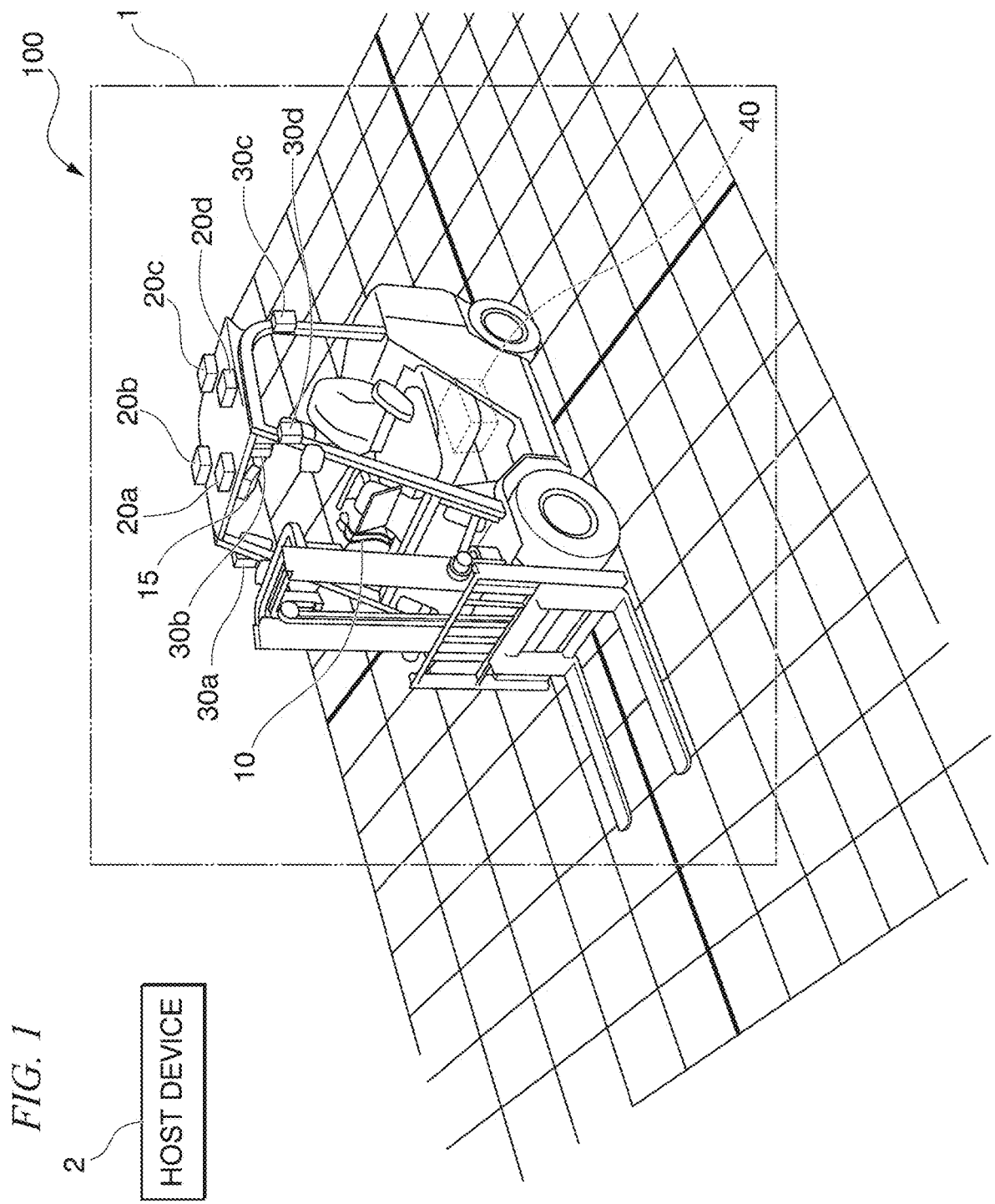
FIG. 1 is a diagram illustrating an example of a configuration of an industrial vehicle according to at least one embodiment of the present disclosure.

The industrial vehicle 1 is, for example, a forklift as illustrated in FIG. 1. However, the industrial vehicle may be a construction machine, such as a wheel loader, vehicles having the same mechanism, such as a cargo handling device and rear wheel steering, or vehicles having the same problem.

As illustrated in FIG. 1, the industrial vehicle 1 includes an operation device 10, an in-vehicle camera 15, a first camera 20a, a second camera 20b, a third camera 20c, a fourth camera 20d, a first speaker 30a, a second speaker 30b, a third speaker 30c, a fourth speaker 30d, and a processing device 40. The processing device 40 acquires information of the current speed, acceleration, and steering angle of the industrial vehicle 1 from sensors (not illustrated) and the state of the operation device 10.

The first camera 20a, the second camera 20b, the third camera 20c, and the fourth camera 20d are collectively referred to as an imaging device 20. The first speaker 30a, the second speaker 30b, the third speaker 30c, and the fourth speaker 30d are collectively referred to as an output device 30.

The operation device 10 is a device that receives the operation of the driver directing the industrial vehicle 1 to perform movement or a cargo handling work. For example, the operation device 10 includes a shift lever that decides the forward and backward movement of the industrial vehicle 1, a steering wheel that decides the steering angle of the wheels of the industrial vehicle 1, and an accelerator and a brake for adjusting the speed or acceleration of the industrial vehicle 1.

The in-vehicle camera 15 captures an image of the inside of the driver's cabin of the industrial vehicle. The image captured by the in-vehicle camera 15 includes at least the face of the driver.

Figure 2:
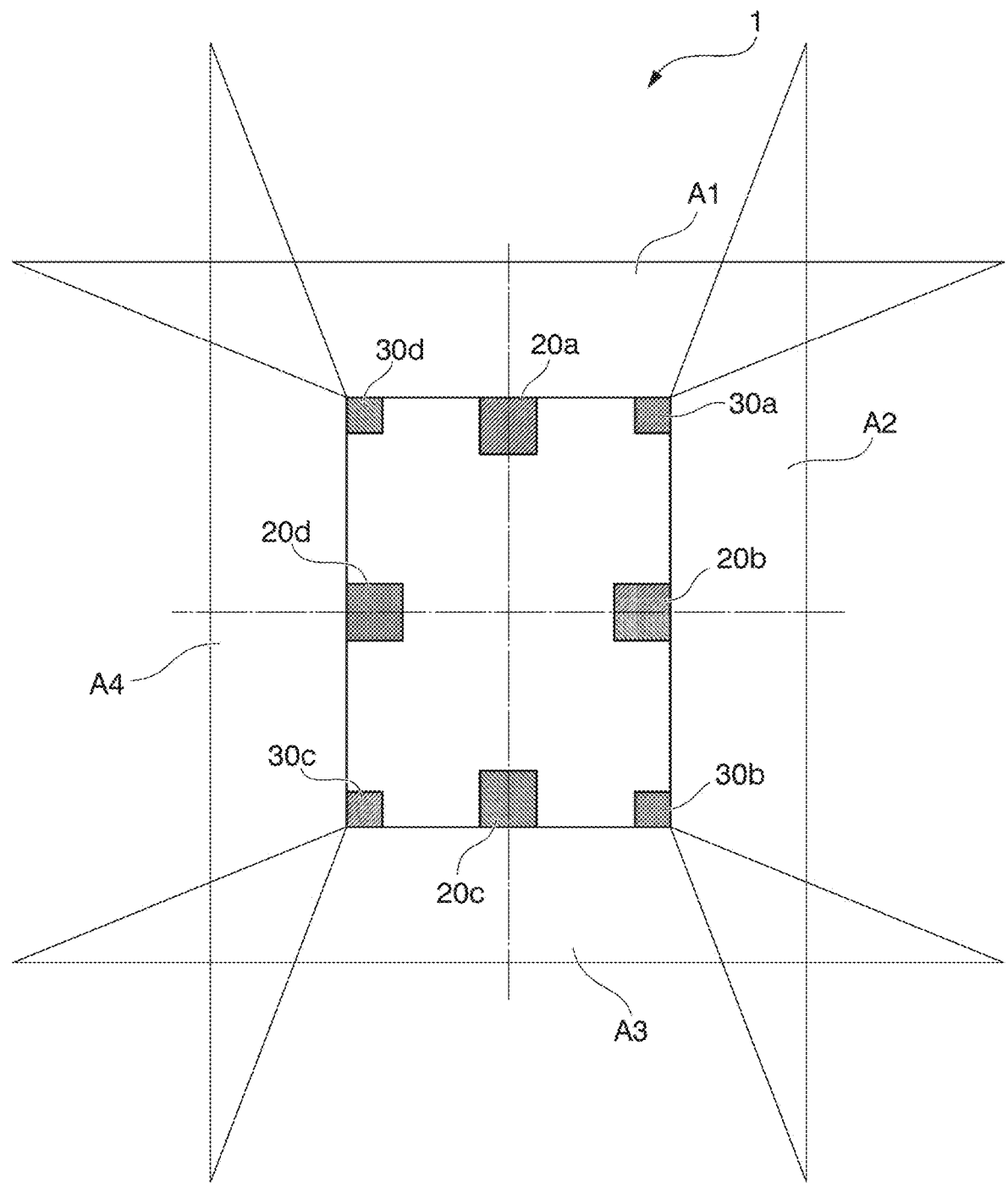
FIG. 2 is a schematic diagram illustrating an industrial vehicle according to at least one embodiment of the present disclosure as viewed from directly above.

FIG. 2 is a schematic diagram illustrating the industrial vehicle 1 as viewed from directly above. The imaging device 20 is provided such that each of a plurality of cameras captures images in the outer peripheral direction of the industrial vehicle 1, and captures the image of the entire periphery of the industrial vehicle 1.

For example, as illustrated in FIG. 1, the first camera 20a, the second camera 20b, the third camera 20c, and the fourth camera 20d are provided on the upper front side, upper right side, upper rear side, and upper left side of the industrial vehicle 1, respectively. Then, for example, the first camera 20a captures the image of a first imaging region A1 illustrated in FIG. 2. Similarly, the second camera 20b, the third camera 20c, and the fourth camera 20d capture the images of a second imaging region A2, a third imaging region A3, and a fourth imaging region A4 illustrated in FIG. 2, respectively.

In the first embodiment of the present disclosure, the cameras are provided on the upper front side, upper right side, upper rear side, and upper left side of the industrial vehicle 1. However, the cameras may be provided in different directions. Further, the camera may include a lens having a wide viewing angle, such as a fisheye lens, to further reduce the number of cameras. Furthermore, in a case in which there is a blind spot, five or more cameras may be provided. The objects recognized by these cameras include a person. Here, the blind spot is a region which is not captured by any camera among the regions in which objects in the vicinity of the industrial vehicle 1 need to be recognized.

The output device 30 outputs sound under the control of the processing device 40.

For example, as illustrated in FIG. 1, the first speaker 30a, the second speaker 30b, the third speaker 30c, and the fourth speaker 30d are provided on the right front side, right rear side, left rear side, and left front size of the driver's seat, respectively. Then, in a case in which the processing device 40 detects an object in the image captured by the imaging device 20, the speaker that is provided in a direction corresponding to the position of the object outputs sound.

In addition, in a case in which a plurality of objects are detected, the output device 30 outputs sound from the speakers corresponding to each of the detected objects.

The processing device 40 estimates the degree of risk of the driving of the industrial vehicle 1 on the basis of the state of the industrial vehicle 1 and the position of the object in the captured image. The state of the industrial vehicle 1 includes the steering angle of the industrial vehicle 1, the traveling direction of the industrial vehicle 1, the speed of the industrial vehicle, and the acceleration of the industrial vehicle. Further, the processing device 40 controls the output device 30 on the basis of the state of the industrial vehicle 1. In a case in which a plurality of objects are detected, the processing device 40 estimates the degree of risk for each object.

Figure 3:
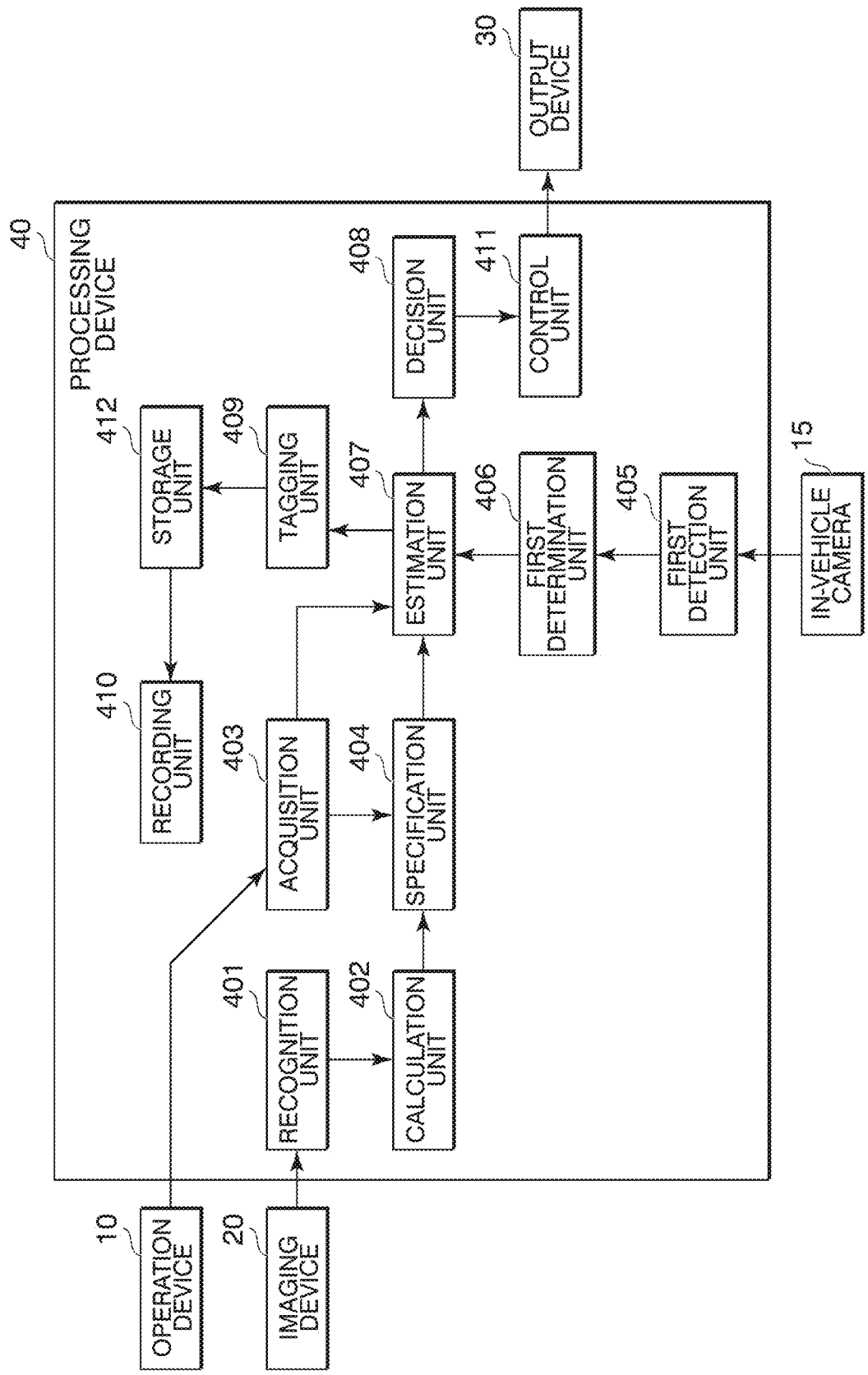
FIG. 3 is a diagram illustrating an example of a configuration of a processing device according to at least one embodiment of the present disclosure.

As illustrated in FIG. 3, the processing device 40 includes a recognition unit 401, a calculation unit 402, an acquisition unit 403, a specification unit 404, a first detection unit 405, a first determination unit 406, an estimation unit 407, a decision unit 408, a tagging unit 409, a recording unit 410, a control unit 411, and a storage unit 412.

The recognition unit 401 recognizes an object in the image captured by the imaging device 20.

For example, the recognition unit 401 stores the characteristics of objects including a person in advance. Then, the recognition unit 401 repeatedly acquires the captured images in the order of the first camera 20a, the second camera 20b, the third camera 20c, and the fourth camera 20d. In a case in which it is determined that the acquired image includes the objects including a person stored in advance using a pattern recognition technique whenever the image is acquired, the recognition unit 401 determines that the objects have been recognized.

In a case in which the recognition unit 401 has recognized the object in the acquired image, the calculation unit 402 calculates the position of the object with respect to the industrial vehicle 1 from the image. That is, the calculation unit 402 calculates the relative position of the object with respect to the industrial vehicle 1.

For example, the calculation unit 402 calculates the position of the object with respect to the industrial vehicle 1 from the image in the following procedure. The position of the object with respect to the industrial vehicle 1 is represented by the direction and distance of the object with respect to the industrial vehicle 1.

The calculation unit 402 calculates the direction of the object with respect to the industrial vehicle 1 in, for example, the following procedure. First, the calculation unit 402 specifies the direction of the object with respect to the imaging device 20 according to the position of a portion including the object in the image (hereinafter, referred to as recognition direction information). Then, the calculation unit 402 specifies from which of the first camera 20a, the second camera 20b, the third camera 20c, and the fourth camera 20d the image in which the object has been recognized is acquired (hereinafter, referred to as recognition camera information). The calculation unit 402 specifies the position and orientation of the camera with respect to the industrial vehicle 1 on the basis of the recognition camera information. Then, the calculation unit 402 calculates the direction of the object with respect to the industrial vehicle 1 on the basis of the specified position and orientation of the camera and the recognition direction information.

Further, for example, the calculation unit 402 calculates a distance between the recognized object and the industrial vehicle 1 in the following procedure. For example, the calculation unit 402 stores an image size (the number of pixels) corresponding to the dimensions of the object and calculates the distance from the industrial vehicle 1 to the object from the ratio of the stored image size to the size (the number of pixels) of the object recognized in the image.

Therefore, the calculation unit 402 can calculate the position of the object with respect to the industrial vehicle 1 by specifying the direction and distance information of the object with respect to the industrial vehicle 1.

The distance from the industrial vehicle 1 to the object included in the distance information is the distance from the camera which has recognized the object. Therefore, the calculation unit 402 can specify the position of the object as viewed from the industrial vehicle 1 by considering the position and orientation on the industrial vehicle 1 of the camera that has recognized the object.

For example, in a case in which the imaging device 20 is a stereo camera, the calculation unit 402 can calculate the distance from the industrial vehicle 1 to the object using a triangulation technique for a pair of images captured by the stereo camera at each imaging timing. In addition, the calculation unit 402 may calculate the distance between the industrial vehicle 1 and the object on the basis of a detection signal output by a distance sensor that is provided in the industrial vehicle 1.

The acquisition unit 403 acquires a vehicle state of the industrial vehicle 1 from the state of the operation device 10 and a sensor (not illustrated) that is provided in the industrial vehicle 1.

For example, the acquisition unit 403 acquires the current speed of the industrial vehicle 1 from a sensor (not illustrated) provided in the industrial vehicle 1. Further, the acquisition unit 403 acquires a signal that is output due to a change in the operation device 10, or periodically acquires a signal indicating the state of the operation device 10. Here, the vehicle state of the industrial vehicle 1 acquired by the acquisition unit 403 from the operation device 10 and the sensor (not illustrated) provided in the industrial vehicle 1 includes states, such as the vehicle speed, the steering angle of the industrial vehicle 1 when the driver rotates the steering wheel, the traveling direction of the industrial vehicle 1 when the driver switches the shift lever to forward or reverse, the positive acceleration of the industrial vehicle 1 when the driver depresses the accelerator, and the deceleration (negative acceleration) of the industrial vehicle 1 when the driver depresses the brake.

The specification unit 404 specifies a vehicle state (first state) in which the industrial vehicle 1 and the object may come into contact with each other on the basis of the position of the object with respect to the industrial vehicle 1 calculated by the calculation unit 402 and the vehicle state of the industrial vehicle 1 acquired by the acquisition unit 403. Specifically, the specification unit 404 specifies a combination of the steering angle and acceleration at which the industrial vehicle 1 and the object may come into contact with each other on the basis of the position of the object with respect to the industrial vehicle 1 and the current speed of the industrial vehicle 1. The acceleration includes both positive acceleration by the accelerator and negative acceleration by the brake. In addition, there may be a plurality of combinations of the steering angle and the acceleration at which the industrial vehicle 1 and the object come into contact with each other. This is because the speed of the vehicle changes depending on the acceleration and there are a plurality of traveling trajectories in which the industrial vehicle 1 collides with the object according to a combination of the steering angle and the acceleration. That is, the turning radius of the industrial vehicle 1 becomes smaller as the steering angle becomes larger and becomes larger as the speed becomes higher (the acceleration becomes higher). Therefore, the traveling trajectory changes depending on the combination of the steering angle and the speed (acceleration).

The first detection unit 405 detects the direction of the line of sight of the driver. For example, the first detection unit 405 acquires the image of the face of the driver from the in-vehicle camera 15 and specifies the orientation of the face, or the orientation of the face and the orientation of the eyes by performing image analysis. Then, the first detection unit 405 detects the orientation of the face, or the orientation of the face and the orientation of the eyes as the direction of the line of sight of the driver.

The first determination unit 406 determines whether or not the driver recognizes the object on the basis of the position of the object calculated by the calculation unit 402 and the direction of the line of sight of the driver detected by the first detection unit 405. Then, the first determination unit 406 generates a weight corresponding to the determination result.

Specifically, the first determination unit 406 determines that the driver recognizes the object in a case in which the object is present within the recognition range of the driver that has the direction of the line of sight of the driver as the center.

More specifically, the first determination unit 406 generate a weight that minimizes the degree of risk associated with tag information in a case in which the angle formed between the direction of the line of sight of the driver as a reference and the direction in which the object is present is 0 degrees. For example, the first determination unit 406 decides the weight as the smallest value among weight candidates less than 1 in a case in which the angle formed between the direction of the line of sight of the driver and the direction in which the object is present is 0 degrees.

In addition, the first determination unit 406 generates a weight that increases the degree of risk associated with the tag information as the angle formed between the direction of the line of sight of the driver and the direction in which the object is present becomes larger. For example, the first determination unit 406 decides a larger weight value as the angle formed between the direction of the line of sight of the driver and the direction in which the object is present becomes larger.

Further, the first determination unit 406 determines that the driver does not recognize the object in a case in which the direction of the line of sight of the driver is out of the range in which the driver can recognize the object, and generates a weight value that maximizes the degree of risk associated with the tag information. For example, the first determination unit 406 decides the weight as the largest value among weight candidates greater than 1 in a case in which the direction of the line of sight of the driver is out of the recognition range of the driver.

The estimation unit 407 estimates the degree of risk of the industrial vehicle 1 on the basis of the vehicle state of the industrial vehicle 1 acquired by the acquisition unit 403, and the vehicle state specified by the specification unit 404 in which the industrial vehicle 1 and the object may come into contact with each other.

The estimation unit 407 estimates the degree of risk in the following procedure.

For each combination of the steering angle and the acceleration specified by the specification unit 404, the estimation unit 407 calculates the difference (gap) between the each combination and the combination of the current steering angles and the acceleration (an example of second acceleration) specified by the specification unit 404. In addition, as the gap becomes smaller, the possibility in which a small change in vehicle state causes the industrial vehicle 1 to come into contact with the object increases. Further, in a case in which the current vehicle state is maintained and the industrial vehicle 1 may come into contact with the object, the gap becomes zero.

The estimation unit 407 calculates the time until the industrial vehicle 1 comes into contact with the object for each combination of the specified steering angle and acceleration, on the basis of the trajectory calculated from the speed of the industrial vehicle 1 and the specified acceleration and steering angle.

Then, the estimation unit 407 calculates the degree of risk for each combination of the steering angle and the acceleration by substituting the gap and the time until the industrial vehicle 1 comes into contact with the object into a predetermined function indicating the degree of risk.

In addition, a specific method for estimating the degree of risk by the estimation unit 407 will be described below.

The estimation unit 407 estimates the degree of risk of the industrial vehicle 1 on the basis of the vehicle state of the industrial vehicle 1 acquired by the acquisition unit 403 and the vehicle state specified by the specification unit 404 in which the industrial vehicle 1 and the object may come into contact with each other.

The estimation unit 407 estimates the degree of risk in the following procedure.

For each combination of the steering angle and the acceleration specified by the specification unit 404, the estimation unit 407 calculates the difference (gap) between the each combination and the combination of the current steering angles and the acceleration (an example of second acceleration) specified by the specification unit 404. In addition, as the gap becomes smaller, the possibility in which a small change in vehicle state causes the industrial vehicle 1 to come into contact with the object increases. Further, in a case in which the current vehicle state is maintained and the industrial vehicle 1 may come into contact with the object, the gap becomes zero.

The estimation unit 407 calculates the time until the industrial vehicle 1 comes into contact with the object for each combination of the specified steering angle and acceleration, on the basis of the trajectory calculated from the speed of the industrial vehicle 1 and the specified acceleration and steering angle.

Then, the estimation unit 407 calculates the degree of risk for each combination of the steering angle and the acceleration by substituting the gap, the time until the industrial vehicle 1 comes into contact with the object, and the weight which is the determination result of the first determination unit 406 into a predetermined function indicating the degree of risk.

In addition, a specific method for estimating the degree of risk by the estimation unit 407 will be described below.

Whenever the estimation unit 407 calculates the degree of risk, the tagging unit 409 associates the degree of risk and predetermined tag information and writes them to the storage unit 412. The tag information is information including the ID of the driver of the industrial vehicle 1, the time when the degree of risk is calculated, the vehicle state of the industrial vehicle 1 acquired by the acquisition unit 403, the image used for estimating the degree of risk, and the positional relationship between the object and the industrial vehicle 1 specified by the recognition unit 401. Hereinafter, the information in which the degree of risk and the tag information are associated with each other is also referred to as risk degree information.

The recording unit 410 records the risk degree information on a database 22 of the host device 2 by transmitting the risk degree information written to the storage unit 412 to the host device 2.

In addition, the recording unit 410 may not write all of the risk degree information to the host device 2 and may transmit, to the host device 2, risk degree information in which the degree of risk is equal to or greater than a first threshold value and equal to or less than a second threshold value among the risk degree information. The first threshold value is a threshold value indicating that the industrial vehicle 1 can be safely driven when the degree of risk is equal to or less than the threshold value. The second threshold value is a threshold value indicating that there is a high possibility of contact between the industrial vehicle 1 and the object, which is dangerous. The degree of risk that is equal to or greater than the first threshold value and is equal to or less than the second threshold value indicates a dangerous state that does not directly lead to an accident (that is, a "near miss accident" state). Further, the setting of the first threshold value and the second threshold value for each driver makes it possible for the host device 2 to notify each driver of the near miss accident. Furthermore, the recording unit 410 may write the degree of risk that is equal to or greater than the first threshold value to the host device 2.

The decision unit 408 decides the volume of the alarm to be output from the output device 30 on the basis of the degree of risk calculated by the estimation unit 407. The volume of the alarm is an example of an aspect of an alarm. In addition, the decision unit 408 according to another embodiment may decide other aspects, such as the tone and frequency of the alarm, instead of the volume.

In a case in which it is determined that the degree of risk is greater than a predetermined threshold value, the decision unit 408 decides the volume of the alarm as a relatively high volume (an example of a first volume).

Further, in a case in which it is determined that the degree of risk is not greater than the predetermined threshold value, the decision unit 408 decides the volume of the alarm as a volume (an example of a second volume) smaller than the first volume.

Specifically, in a case in which the direction of the object calculated by the calculation unit 402 is the right front side, when the degree of risk is greater than the predetermined threshold value, the decision unit 408 decides the volume of the alarm to be output from the first speaker 30a as a high volume (first volume).

In addition, in a case in which the direction of the object calculated by the calculation unit 402 is the right front side, when the degree of risk is not greater than the predetermined threshold value, the decision unit 408 decides the volume of the alarm to be output from the first speaker 30a as a low volume (second volume).

Further, in a case in which the direction of the object calculated by the calculation unit 402 is the right rear side, when the degree of risk is greater than the predetermined threshold value, the decision unit 408 decides the volume of the alarm to be output from the second speaker 30b as a high volume (first volume).

Furthermore, in a case in which the direction of the object calculated by the calculation unit 402 is the right rear side, when the degree of risk is not greater than the predetermined threshold value, the decision unit 408 decides the volume of the alarm to be output from the second speaker 30b as a low volume (second volume).

Moreover, in a case in which the direction of the object calculated by the calculation unit 402 is the left rear side, when the degree of risk is greater than the predetermined threshold value, the decision unit 408 decides the volume of the alarm to be output from the third speaker 30c as a high volume (first volume).

In addition, in a case in which the direction of the object calculated by the calculation unit 402 is the left rear side, when the degree of risk is not greater than the predetermined threshold value, the decision unit 408 decides the volume of the alarm to be output from the third speaker 30c as a low volume (second volume).

Further, in a case in which the direction of the object calculated by the calculation unit 402 is the left front side, when the degree of risk is greater than the predetermined threshold value, the decision unit 408 decides the volume of the alarm to be output from the fourth speaker 30d as a high volume (first volume).

In addition, in a case in which the direction of the object calculated by the calculation unit 402 is the left front side, when the degree of risk is not greater than the predetermined threshold value, the decision unit 408 decides the volume of the alarm to be output from the fourth speaker 30d as a low volume (second volume).

In the specific example illustrated here, the decision unit 408 outputs a loud sound or a sound smaller than the sound according to whether or not the degree of risk received from the estimation unit 407 is greater than one predetermined threshold value. However, in another embodiment of the present disclosure, a plurality of threshold values may be set in advance, and the decision unit 408 may compare the degree of risk received from the estimation unit 407 with the plurality of threshold values and may control the output device 30 such that sound corresponding the degree of risk received from the estimation unit 407 is output, that is, the volume of sound becomes higher as the degree of risk received from the estimation unit 407 becomes higher.

Further, in another embodiment of the present disclosure, the decision unit 408 may decide the aspect of the alarm such that no sound is output in a case in which the degree of risk received from the estimation unit 407 is less than the threshold value.

Furthermore, in another embodiment of the present disclosure, the weighting of the degree of risk may be divided into cases according to more conditions.

Further, in another embodiment of the present disclosure, the decision unit 408 may decide the aspect of the alarm on the basis of the weight which is the determination result of the first determination unit 406, regardless of the degree of risk.

The control unit 411 controls the speaker corresponding to the position of the object so as to output an alarm with the volume decided by the decision unit 408.

For example, in a case in which the position of the object with respect to the industrial vehicle 1 calculated from the acquired image is the right front side of the industrial vehicle 1, when the degree of risk associated with the image is greater than a predetermined third threshold value, the control unit 411 controls the output device 30 such that sound is output from the first speaker 30a. In addition, the third threshold value is a risk degree threshold value for determining whether or not to output sound. The third threshold value may be a value that is equal to the first threshold value or the second threshold value. In a case in which the third threshold value is different from the first threshold value or the second threshold value, control different from the control for the first threshold value or the second threshold value may be performed.

Similarly, in a case in which the position of the object with respect to the industrial vehicle 1 calculated from the acquired image is the right rear side, left rear side, or left front side of the industrial vehicle 1, when the degree of risk associated with the image is greater than the third threshold value, the control unit 411 controls the output device 30 such that sound is output from the corresponding speaker among the second speaker 30b, the third speaker 30c, and the fourth speaker 30d.

The storage unit 412 stores various kinds of information necessary for the process performed by the processing device 40.

(Method for Estimating Degree of Risk)

Here, an example of a method for estimating the degree of risk by the estimation unit 407 will be described.

Figures 4, 5:
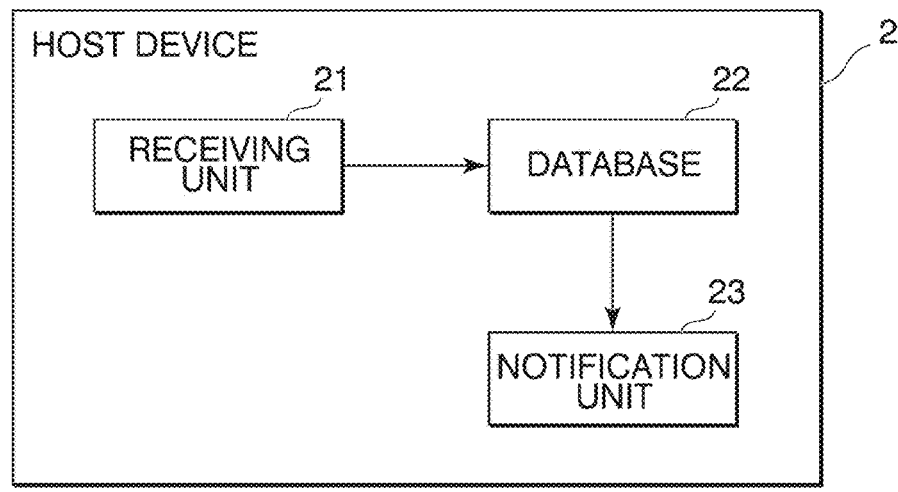
FIG. 4 is a diagram illustrating an example of the state of an industrial vehicle and a gap according to at least one embodiment of the present disclosure.
FIG. 5 is a diagram illustrating an example of a configuration of a host device according to at least one embodiment of the present disclosure.

First, as illustrated in FIG. 4, the specification unit 404 calculate the acceleration at which the industrial vehicle 1 comes into contact with the object for a plurality of steering angles (for example, an interval of 1 degree) in the possible steering angle range of the industrial vehicle 1, using the position of the object with respect to the industrial vehicle 1 and the current speed of the industrial vehicle 1 as initial conditions. For example, the specification unit 404 calculates the acceleration at which the trajectory of the industrial vehicle 1 passes through the position of the object in a function (that is, a curve function that draws the trajectory of the industrial vehicle 1) in which the initial speed, the acceleration, and the steering angle are constants, time is an explanatory variable, and the position of the industrial vehicle 1 is an objective variable. In addition, there may be no acceleration at which the industrial vehicle 1 comes into contact with the object, depending on the steering angle. The specification unit 404 extracts a steering angle, at which the acceleration at which the industrial vehicle 1 comes into contact with the object is present, among a plurality of steering angles. Hereinafter, a combination of the extracted steering angle and acceleration is also referred to as a contact case. As illustrated in FIG. 4, the specification unit 404 gives a case No. to each contact case. In addition, in FIG. 4, case No. 0 is given to the current state of the industrial vehicle 1, regardless of whether or not the object comes into contact with the industrial vehicle 1.

The estimation unit 407 calculates a gap between the current state of the industrial vehicle 1 (a state related to case No. 0) and a state related to the contact case for each of the extracted contact cases. For example, the estimation unit 407 calculates, as the gap, the sum (weighted Manhattan distance) of a value obtained by multiplying the difference between the current steering angle and the steering angle related to the contact case by a predetermined weight and a value obtained by multiplying the difference between the current acceleration and the acceleration related to the contact case by a predetermined weight. In addition, the estimation unit 407 may calculate the gap on the basis of other criteria such as the Euclidean distance.

Specifically, in the example illustrated in FIG. 4, the gap in case No. 2 is 8. In contrast, in case No. 3, for the difference from the current state, both the steering angle and the acceleration are greater than those in case No. 2. Therefore, the gap in case No. 3 is 10, which is greater than the gap in case No. 2.

For each of the extracted contact cases, the estimation unit 407 calculates the time until the industrial vehicle 1 comes into contact with the object on the basis of the current speed of the industrial vehicle 1 and the acceleration related to the contact case. For example, the estimation unit 407 calculates the time when the position of the industrial vehicle 1 is matched with the position of the object on the basis of the above-mentioned curve function.

Then, the estimation unit 407 estimates the degree of risk for each contact case by substituting the gap, the time until the industrial vehicle 1 comes into contact with the object, and the weight related to the recognition of the object by the driver into a predetermined function indicating the degree of risk. As illustrated in FIG. 5, the estimation unit 407 estimates the degree of risk using a predetermined function in which the degree of risk becomes higher as the gap becomes smaller and becomes higher as the time until the industrial vehicle 1 comes into contact with the object becomes shorter. For example, the estimation unit 407 may estimate the degree of risk by calculating the reciprocal of the sum of a value obtained by multiplying the gap by a predetermined weight, a value obtained by multiplying the time until contact by a predetermined weight, and the weight related to the recognition of the object by the driver.

(Configuration of Host Device)

As illustrated in FIG. 5, the host device 2 includes a receiving unit 21, the database 22, and a notification unit 23.

The receiving unit 21 receives the risk degree information from the industrial vehicle 1. The receiving unit 21 records the received risk degree information on the database 22.

The database 22 stores various kinds of information necessary for the process performed by the host device 2.

The notification unit 23 notifies each driver of the degree of risk in which the tag information and the image stored in the storage unit 412 are associated with each other. Therefore, the driver can grasp the operation in a state in which a near miss accident occurs in the operation of the industrial vehicle 1. The driver improves the driving skill of the industrial vehicle 1 by practicing the operation in a state in which the near miss accident occurs. As a result, it is possible to reduce dangerous driving and thus to reduce accidents.

(Process Performed by Processing Device)

Next, the process performed by the processing device 40 that estimates the degree of risk will be described.

Here, the process flow of the processing device 40 illustrated in FIG. 6 will be described.

In addition, it is assumed that the imaging device 20 captures the image of the entire periphery of the industrial vehicle 1. The processing device 40 performs the process illustrated in FIG. 6 for each predetermined control cycle.

The recognition unit 401 acquires the captured image from the imaging device 20 (Step S1). The recognition unit 401 determines whether or not the image acquired in Step S1 includes an object using a pattern recognition technique (Step S2).

In a case in which the recognition unit 401 determines that the acquired image does not include an object (NO in Step S2), it ends the process.

In a case in which the recognition unit 401 determines that the acquired image includes an object (YES in Step S2), the calculation unit 402 calculates the position of the object with respect to the industrial vehicle 1 on the basis of the image (Step S3).

The acquisition unit 403 acquires the current state of the industrial vehicle 1 from, for example, a sensor (not illustrated) and the like, that is provided in the industrial vehicle (Step S4).

The first detection unit 405 detects the direction of the line of sight of the driver by acquiring the image of the face of the driver and performs image analysis (Step S5). The first determination unit 406 determines whether or not the driver recognizes the object on the basis of the position of the object detected in Step S3 and the direction of the line of sight of the driver detected in Step S5 and generates a weight corresponding to the determination result (Step S6).

The specification unit 404 specifies a combination (contact case) of the steering angle and the acceleration at which the industrial vehicle 1 comes into contact with the object on the basis of the position of the object with respect to the industrial vehicle 1 specified by the recognition unit 401 in Step S3 and the current speed of the industrial vehicle 1 acquired in Step S4 (Step S7).

The estimation unit 407 calculates the gap between the current vehicle state acquired in Step S4 and the vehicle state related to the contact case for each specified contact case (Step S8).

The estimation unit 407 calculates the time until the industrial vehicle 1 comes into contact with the object for each specified contact case, on the basis of the trajectory calculated from the speed of the industrial vehicle 1 acquired in Step S4 and the acceleration and the steering angle related to the specified contact case (Step S9).

The estimation unit 407 estimates the degree of risk for each contact case on the basis of the gap calculated in Step S8, the time until the industrial vehicle 1 comes into contact with the object calculated in Step S9, and the weight calculated in Step S6 (Step S10).

The decision unit 408 determines whether or not the degree of risk estimated in Step S10 is greater than a predetermined threshold value (Step S11). In a case in which the degree of risk is greater than the threshold value (YES in Step S11), the decision unit 408 decides the aspect of the alarm as the aspect of the first volume which is a high volume (Step S12). On the other hand, in a case in which the degree of risk is not greater than the threshold value (NO in Step S11), the decision unit 408 decides the aspect of the alarm as the aspect of the second volume which is a low volume (Step S13).

The control unit 411 determines whether or not the degree of risk estimated by the estimation unit 407 is greater than the predetermined third threshold value (Step S14). In a case in which the degree of risk is greater than the third threshold value (YES in Step S14), the control unit 411 controls the output device 30 such that the sound of the aspect decided by the decision unit 408 is output from the speaker corresponding to the object (Step S15). On the other hand, in which the degree of risk is not greater than the third threshold value (NO in Step S14), the control unit 411 does not output sound from the speaker.

Whenever the estimation unit 407 calculates the degree of risk, the tagging unit 409 generates risk degree information such that predetermined tag information is associated with the degree of risk and writes the risk degree information to the storage unit 412 (Step S16). Then, the recording unit 410 transmits the risk degree information stored in the storage unit 412 to the host device 2 instantly or at a predetermined timing (Step S17).

The receiving unit 21 of the host device 2 receives the risk degree information and records the risk degree information on the database 22. The notification unit 23 generates a near miss accident report for each driver on the basis of the risk degree information stored in the database 22. Then, the notification unit 23 notifies each driver of the generated near miss accident report. Therefore, the driver can grasp the operation in a state in which a near miss accident occurs in the operation of the industrial vehicle 1.

(Operation and Effect)

The notification system 100 according to the first embodiment of the present disclosure has been described above.

In the processing device 40 of the notification system 100, the control unit 411 directs the speaker (any of the first speaker 30a, the second speaker 30b, and the third speaker 30c, and the fourth speaker 30d) indicating the presence of the object to output sounds of different aspects on the basis of whether or not the driver of the industrial vehicle 1 recognizes the object that may be an obstacle.

This makes it possible for the processing device 40 to notify the presence of the object around the industrial vehicle 1 in an aspect corresponding to the state of the driver of the industrial vehicle 1.

Second Embodiment

Next, a notification system 100 according to a second embodiment of the present disclosure will be described.

In the second embodiment of the present disclosure, the object is a person.

The notification system 100 according to the second embodiment is different from that according to the first embodiment in the configuration of the processing device 40.

(Configuration of Processing Device)

Figure 7:
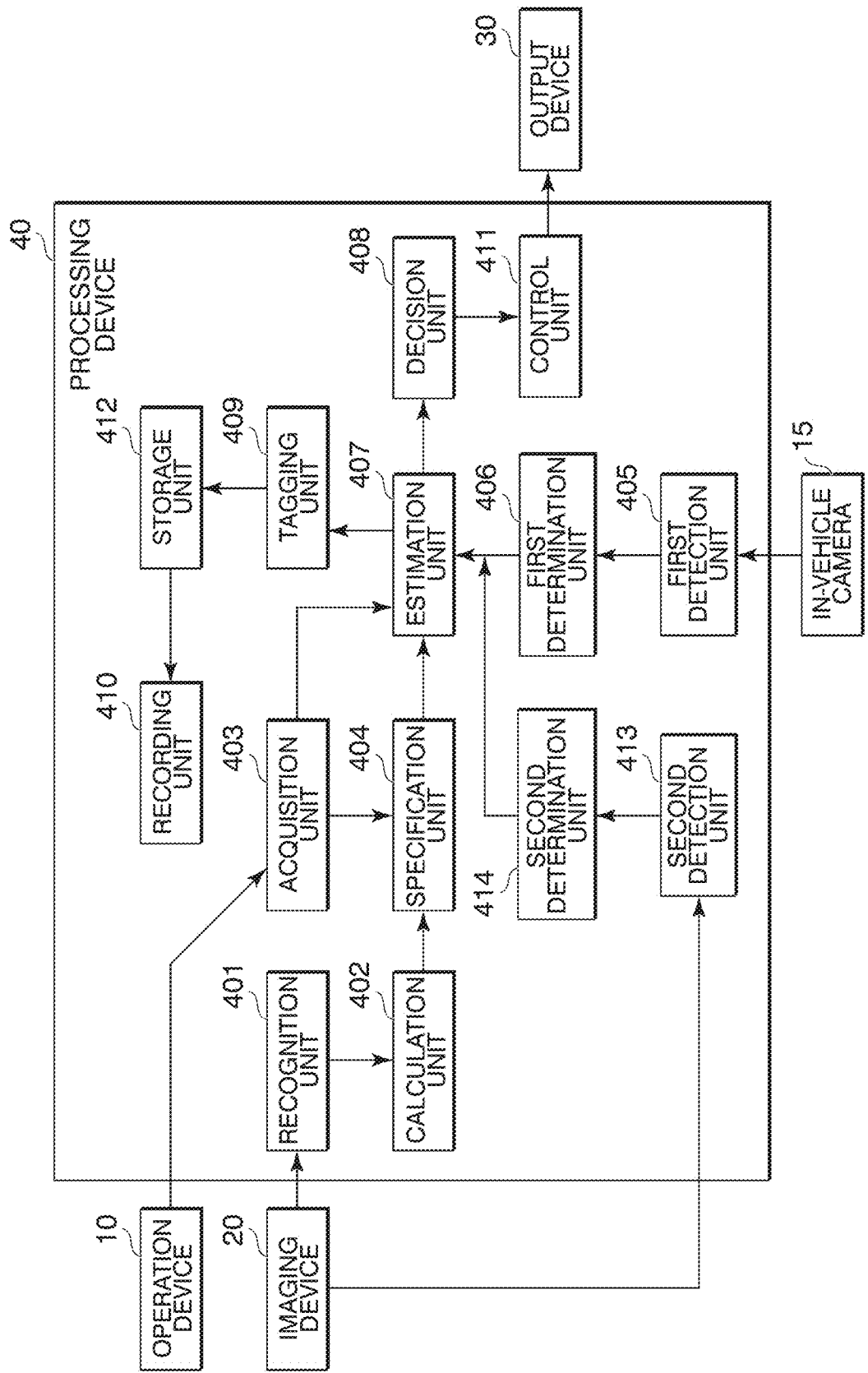
FIG. 7 is a diagram illustrating an example of a configuration of a processing device according to at least one embodiment of the present disclosure.

A processing device 40 according to the second embodiment of the present disclosure includes a second detection unit 413 and a second determination unit 414 in addition to the configuration of that according to the first embodiment as illustrated in FIG. 7.

The second detection unit 413 detects the direction of the line of sight of the person. For example, the second detection unit 413 specifies the orientation of the face, or the orientation of the face and the orientation of the eyes by acquiring the image of the face of the person and performs image analysis. Then, the second detection unit 413 detects the orientation of the face, or the orientation of the face and the orientation of the eyes as the direction of the line of sight of the person.

The second determination unit 414 further determines whether or not the person recognizes the industrial vehicle 1 for the degree of risk weighted on the basis of whether or not the driver recognizes the person, and generates a weight. That is, the second determination unit 414 performs weighting corresponding to the direction of the line of sight of the person detected by the second detection unit 413.

Specifically, the second determination unit 414 determines that the person recognizes the industrial vehicle 1 in a case in which the direction of the line of sight of the person is within the range in which the person can recognize the industrial vehicle 1, and generates a weight according to the angle of the direction in which the industrial vehicle 1 is present from the direction of the line of sight of the person as a reference (0 degrees).

More specifically, the second determination unit 414 generates a weight that minimizes the degree of risk in a case in which the angle of the direction in which the industrial vehicle 1 is present from the reference is 0 degrees. In addition, the second determination unit 414 generates a weight that increases the degree of risk as the angle of the direction in which the industrial vehicle 1 is present from the reference becomes larger.

Further, for example, in a case in which the direction of the line of sight of the person is out of the range in which the person can recognize the industrial vehicle 1, the second determination unit 414 determines that the person does not recognize the industrial vehicle 1 and generates a weight that maximize the degree of risk.

(Process Performed by Industrial Vehicle)

Next, the process performed by the industrial vehicle 1 which notifies the driver that the operation of the industrial vehicle 1 is in a dangerous state will be described.

Figure 8:
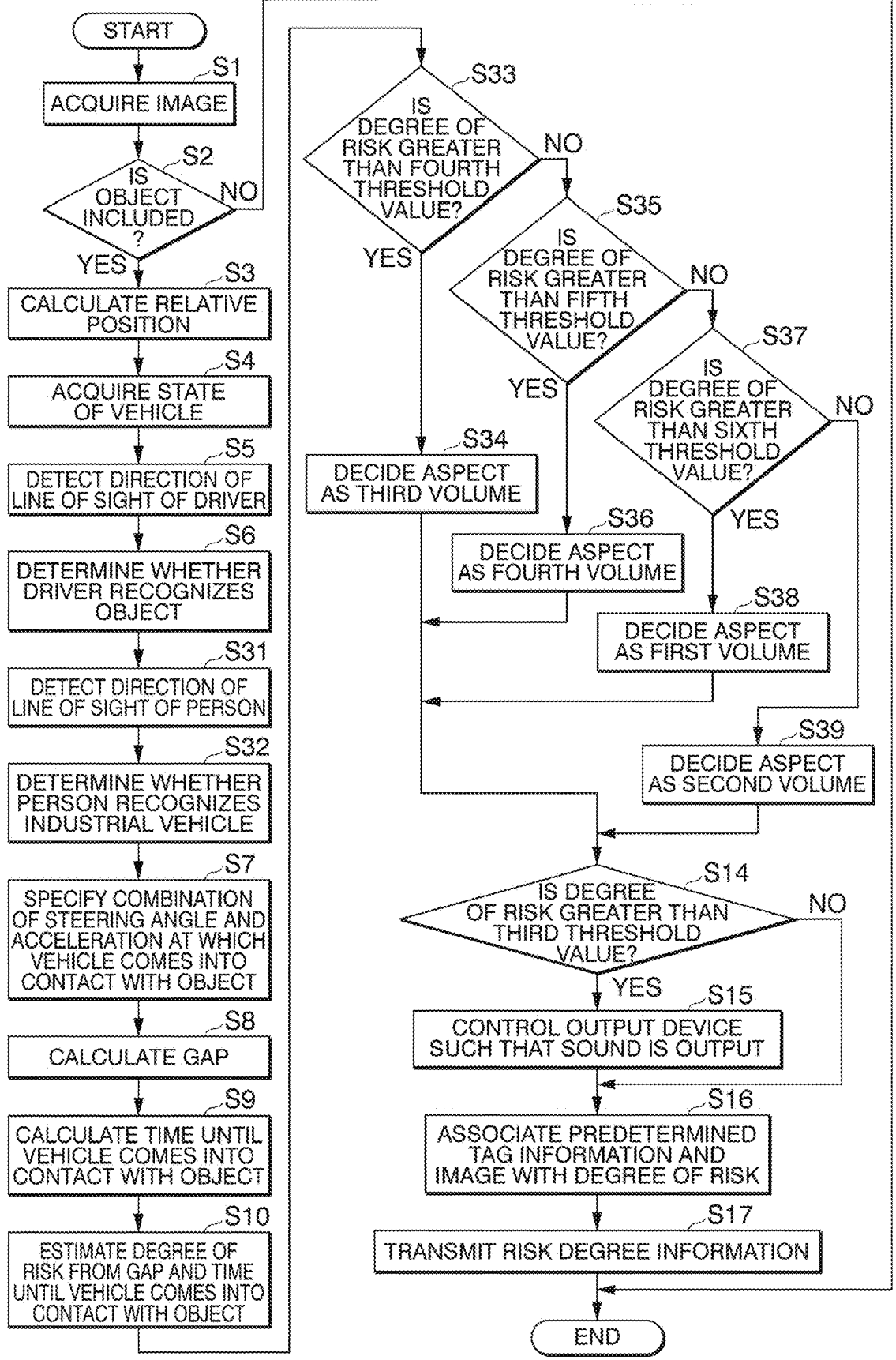
FIG. 8 is a diagram illustrating an example of the process flow of an industrial vehicle according to at least one embodiment of the present disclosure.

Here, the process flow of the industrial vehicle 1 illustrated in FIG. 8 will be described.

In the example described here, a process flow in a case in which three threshold values of a fourth threshold value, a fifth threshold value, and a sixth threshold value are used as threshold values which are criteria for determining whether or not to direct the speaker provided in the direction in which the object is present to output sound to the driver will be described. It is assumed that the fourth threshold value is greater than the fifth threshold value and the fifth threshold value is greater than the sixth threshold value. The reason why the three threshold values are set is that the degree of risk is divided into two cases for whether or not the driver recognizes the person and the degree of risk is divided into two cases for whether or not the person recognizes the industrial vehicle 1, that is, the degree of risk is divided into four cases and weighting is performed. Here, the four cases are a case in which the driver recognizes the person and the person recognizes the industrial vehicle 1, a case in which the driver recognizes the person and the person does not recognize the industrial vehicle 1, a case in which the driver does not recognize the person and the person recognizes the industrial vehicle 1, and a case in which the driver does not recognize the person and the person does not recognize the industrial vehicle 1.

The processing device 40 of the industrial vehicle 1 performs the same process in Steps S1 to S6 as in the first embodiment. Next, the second detection unit 413 of the processing device 40 detects the direction of the line of sight of the person by acquiring the image of the face of the person and performs image analysis to (Step S31). The second determination unit 414 determines whether or not the person recognizes the industrial vehicle 1 and generates a weight (Step S32).

After Step S32, the processing device 40 performs the same process in Steps S7 to S10 as in the first embodiment. Further, in Step S10, the estimation unit 407 estimates the degree of risk for each contact case on the basis of the gap calculated in Step S8, the time until contact with the object calculated in Step S9, the weight generated in Step S6, and the weight generated in Step S32.

Next, the decision unit 408 determines whether or not the degree of risk estimated in Step S10 is greater than the predetermined fourth threshold value (Step S33).

In a case in which the decision unit 408 determines that the degree of risk is greater than the predetermined fourth threshold value (YES in Step S33), it decides the volume of the alarm as the highest volume (an example of a third volume) (Step S34).

Further, in a case in which the decision unit 408 determines that the degree of risk is not greater than the predetermined fourth threshold value (NO in Step S33), it determines whether or not the degree of risk estimated in Step S10 is greater than the predetermined fifth threshold value (Step S35).

In a case in which the decision unit 408 determines that the degree of risk is greater than the predetermined fifth threshold value (YES in Step S35), it decides the volume of the alarm as the second highest volume (an example of a fourth volume) (Step S36).

Further, in a case in which the decision unit 408 determines that the degree of risk is not greater than the predetermined fifth threshold value (NO in Step S35), it determines whether or not the degree of risk estimated in Step S10 is greater the predetermined sixth threshold value (Step S37).

In a case in which the decision unit 408 determines that the degree of risk is greater than the predetermined sixth threshold value (YES in Step S37), it decides the volume of the alarm as the third highest volume (an example of a first volume) (Step S38).

Further, in a case in which the decision unit 408 determines that the degree of risk is not greater the predetermined sixth threshold value (NO in Step S37), it decides the volume of the alarm as the lowest volume (an example of a second volume) (Step S39). Then, the processing device 40 performs the same process in Steps S14 to S17 as in the first embodiment and ends the process.

In the specific example described here, the decision unit 408 decides the volume of the alarm as any one of four volume levels according to whether or not the degree of risk received from the estimation unit 407 is greater than three predetermined threshold values. However, in another embodiment of the present disclosure, a single threshold value or a plurality of threshold values other than the three threshold values may be set in advance, and the decision unit 408 may compare the degree of risk received from the estimation unit 407 with the threshold values and may control the output device 30 such that a sound corresponding to the degree of risk received from the estimation unit 407 is output, that is, the sound becomes louder as the degree of risk received from the estimation unit 407 becomes higher.

Further, in another embodiment of the present disclosure, the control unit 411 may control the output device 30 such that no sound is output in a case in which the degree of risk received from the estimation unit 407 is less than the threshold value.

Furthermore, in another embodiment of the present disclosure, the weighting of the degree of risk may be divided into cases according to more conditions.

Further, in another embodiment of the present disclosure, the decision unit 408 may decide to output a sound with a predetermined volume in a case in which it is determined that the degree of risk is equal to or greater than a certain threshold value, and may perform weighting for the volume of a sound corresponding to each of a case in which the driver recognizes the person and the person recognizes the industrial vehicle 1, a case in which the driver recognizes the person and the person does not recognize the industrial vehicle 1, a case in which the driver does not recognizes the person and the person recognizes the industrial vehicle 1, and a case in which the driver does not recognize the person and the person does not recognize the industrial vehicle 1 for the sound with the predetermined volume.

Furthermore, in another embodiment of the present disclosure, the decision unit 408 may acquire the weight based on the determination of whether or not the person recognizes the industrial vehicle 1 executed by the second determination unit 414 and may sound an alarm (for example, a horn) to the person in a case in which the acquired weight is a weight indicating that the person does not recognize the industrial vehicle 1 or in a case in which the acquired weight is a weight indicating that the person recognizes the industrial vehicle 1, but is equal to or greater than a predetermined weight.

(Operation and Effect)

The notification system 100 according to the second embodiment of the present disclosure has been described above.

In the processing device 40 of the notification system 100, the decision unit 408 decides the aspect of the alarm on the basis of whether or not a person who is the object recognizes the industrial vehicle 1.

Therefore, the processing device 40 notifies the presence of the object around the industrial vehicle 1 in an aspect corresponding to not only the state of the driver of the industrial vehicle 1 but also the state of the person by detecting the direction of the line of sight of the person.

Third Embodiment

Next, a notification system 100 according to a third embodiment of the present disclosure will be described.

In the third embodiment of the present disclosure, the object is a person.

The notification system 100 according to the third embodiment is different from that in the first embodiment in the configuration of the processing device 40.

(Configuration of Processing Device)

Figure 9:
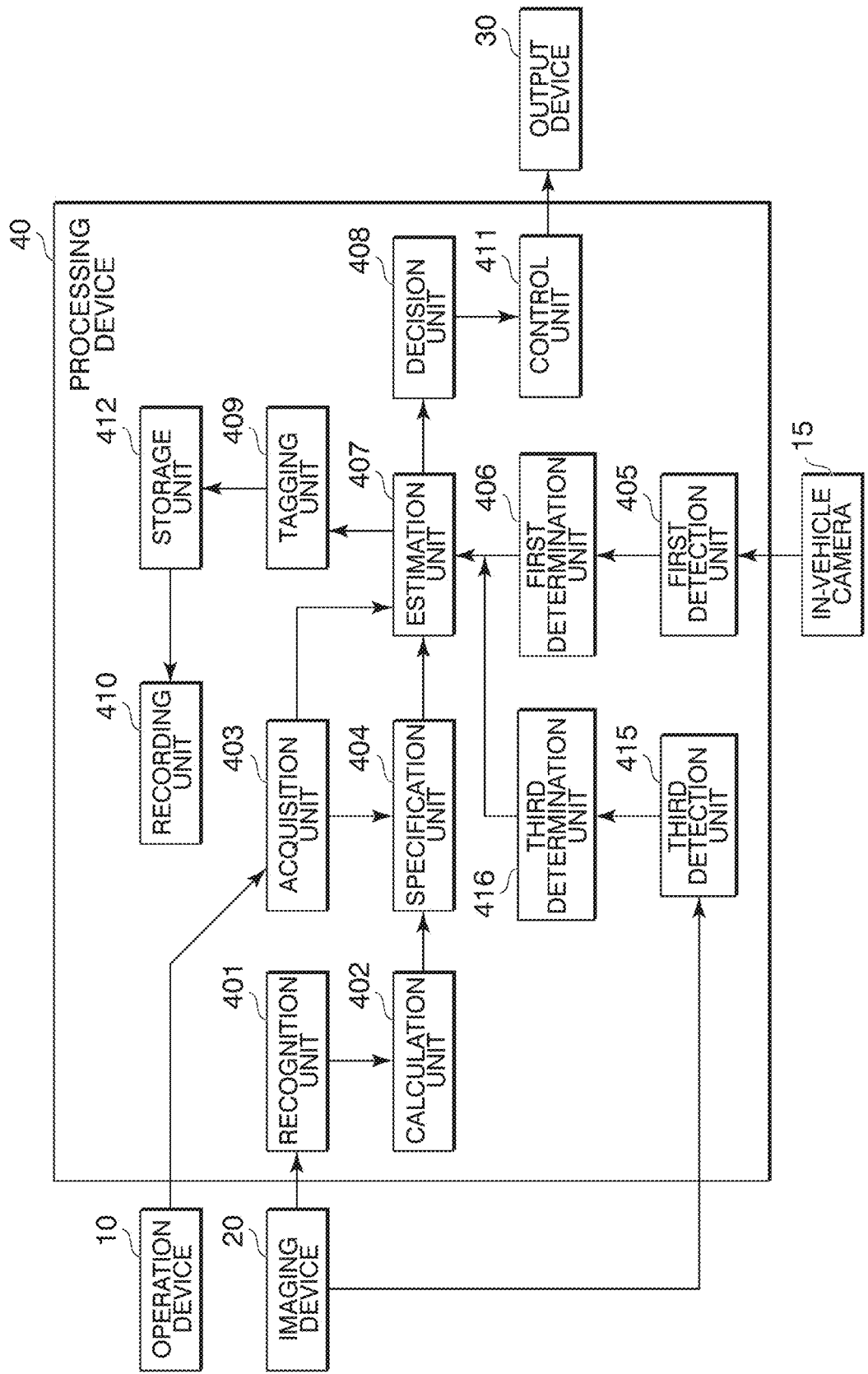
FIG. 9 is a diagram illustrating an example of a configuration of a processing device according to at least one embodiment of the present disclosure.

As illustrated in FIG. 9, the processing device 40 according to the third embodiment of the present disclosure includes a third detection unit 415 and a third determination unit 416 in addition to the configuration of the first embodiment.

The third detection unit 415 detects the posture of a person.

For example, the third detection unit 415 detects the posture of the person such as a standing posture or a sitting posture by acquiring the image of the entire person and performing image analysis, such as pattern matching.

The third determination unit 416 determines whether or not the person is in a movable state on the basis of the detection result of the third detection unit 415 and generates a weight. That is, the third determination unit 416 performs weighting corresponding to the posture of the person detected by the third detection unit 415.

Specifically, the third determination unit 416 determines that the person is in the movable state in a case in which the posture of the person is the standing posture and generates a weight for reducing the degree of risk. Further, in a case in which the posture of the person is the sitting posture, the third determination unit 416 determines that the person is in a state in which it is difficult for the person to move and sets the degree of risk to be higher than the degree of risk in a case in which the posture of the person is the standing posture.

Figure 6:
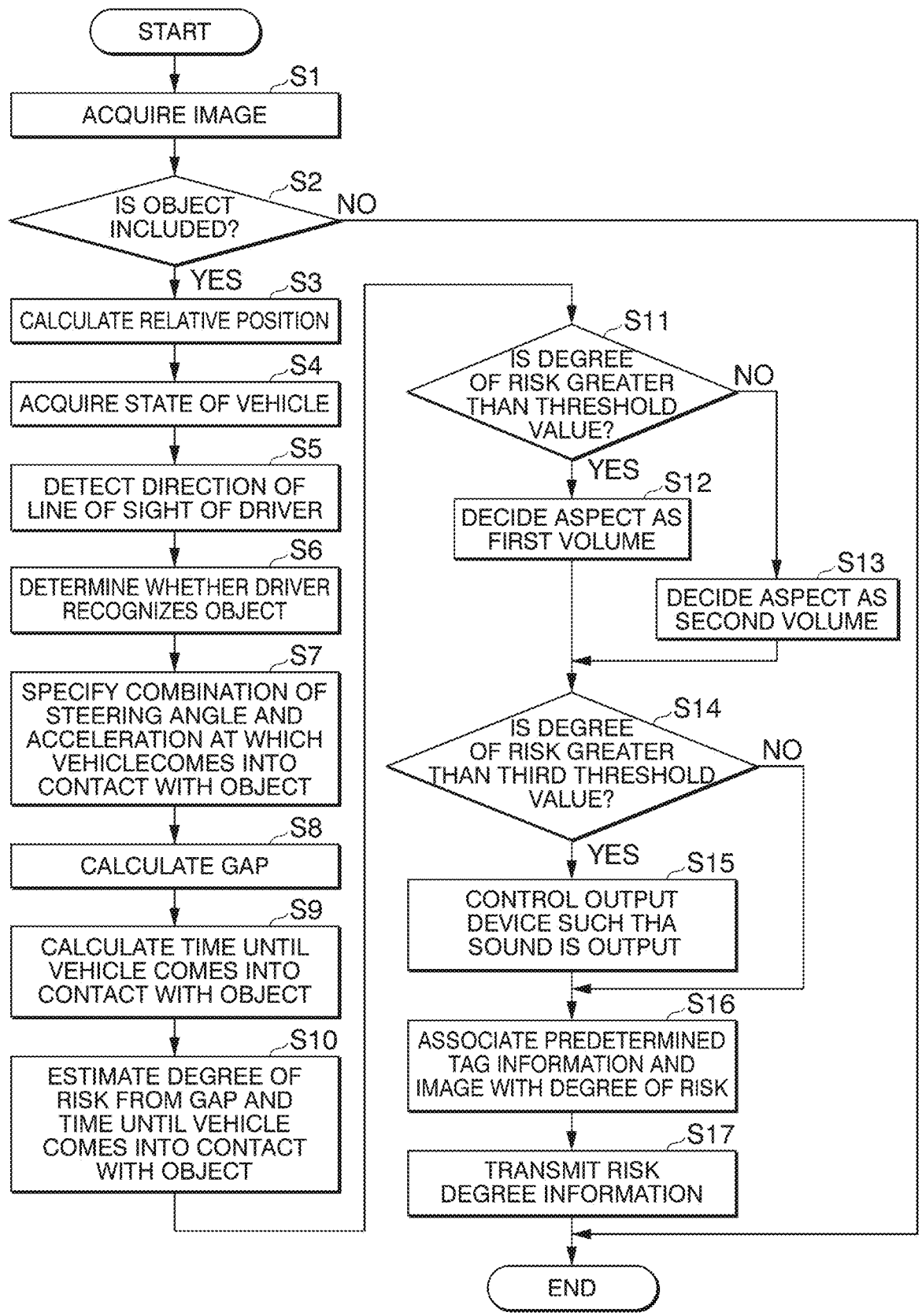
FIG. 6 is a diagram illustrating an example of the process flow of a processing device according to at least one embodiment of the present disclosure.

Further, the flow of the process performed by the industrial vehicle 1 in a case in which a threshold value, which is compared with the degree of risk received from the estimation unit 407 and is a criterion for determining whether or not to direct the speaker provided in the direction in which the object is present to output sound to the driver, is the same as the threshold value in the first embodiment can be described similarly to the process flow of the industrial vehicle 1 illustrated in FIG. 6.

In addition, in another embodiment of the present disclosure, a plurality of threshold values may be set in advance, and the decision unit 408 may compare the degree of risk received from the estimation unit 407 with the plurality of threshold values and may control the output device 30 such that a sound corresponding to the degree of risk received from the estimation unit 407 is output, that is, the sound becomes louder as the degree of risk received from the estimation unit 407 becomes higher (an example of a fifth volume).

Further, in another embodiment of the present disclosure, the control unit 411 may control the output device 30 such that no sound is output (an example of a sixth volume) in a case in which the degree of risk received from the estimation unit 407 is less than the threshold value.

Furthermore, in another embodiment of the present disclosure, the weighting of the degree of risk may be divided into cases according to more conditions.

Further, in another embodiment of the present disclosure, the control unit 411 may acquire a weight based on whether or not the person is movable determined by the third determination unit 416 and may sound an alarm (for example, a horn) to the person in a case in which the acquired weight is a weight indicating that the person is not movable or in a case in which the acquired weight is a weight indicating that the person is movable and is equal to or greater than a predetermined weight.

In addition, in another embodiment of the present invention, for example, the third detection unit 415 acquires the image of the entire person. Actual result information indicating the actual movement result of the person is associated with each image of the entire person acquired by the third detection unit 415. These images are used as training data.

In this case, the third determination unit 416 may be implemented by a machine learning model. Then, the image associated with the actual result information is input to the learning model, and a coefficient of the learning model is adjusted such that the output of the learning model is matched with the actual movement result of the person corresponding to the input image to generate a trained model. An image indicating the posture newly acquired by the third detection unit 415 may be input to the trained model to determine whether or not the person can move and avoid contact with the industrial vehicle 1, and the degree of risk may be weighted.

(Operation and Effect)

The notification system 100 according to the third embodiment of the present disclosure has been described above.

In the processing device 40 of the notification system 100, the control unit 411 directs the speaker (any of the first speaker 30a, the second speaker 30b, the third speaker 30c, and the fourth speaker 30d) indicating the presence of the object to output sounds of different aspects on the basis of whether or not the person who is the object is in a movable state.

Therefore, the processing device 40 can notify the presence of a person or an object around the industrial vehicle 1 in an aspect corresponding to not only the state of the driver of the industrial vehicle 1 but also the state of the person who is the object.

Figure 10:
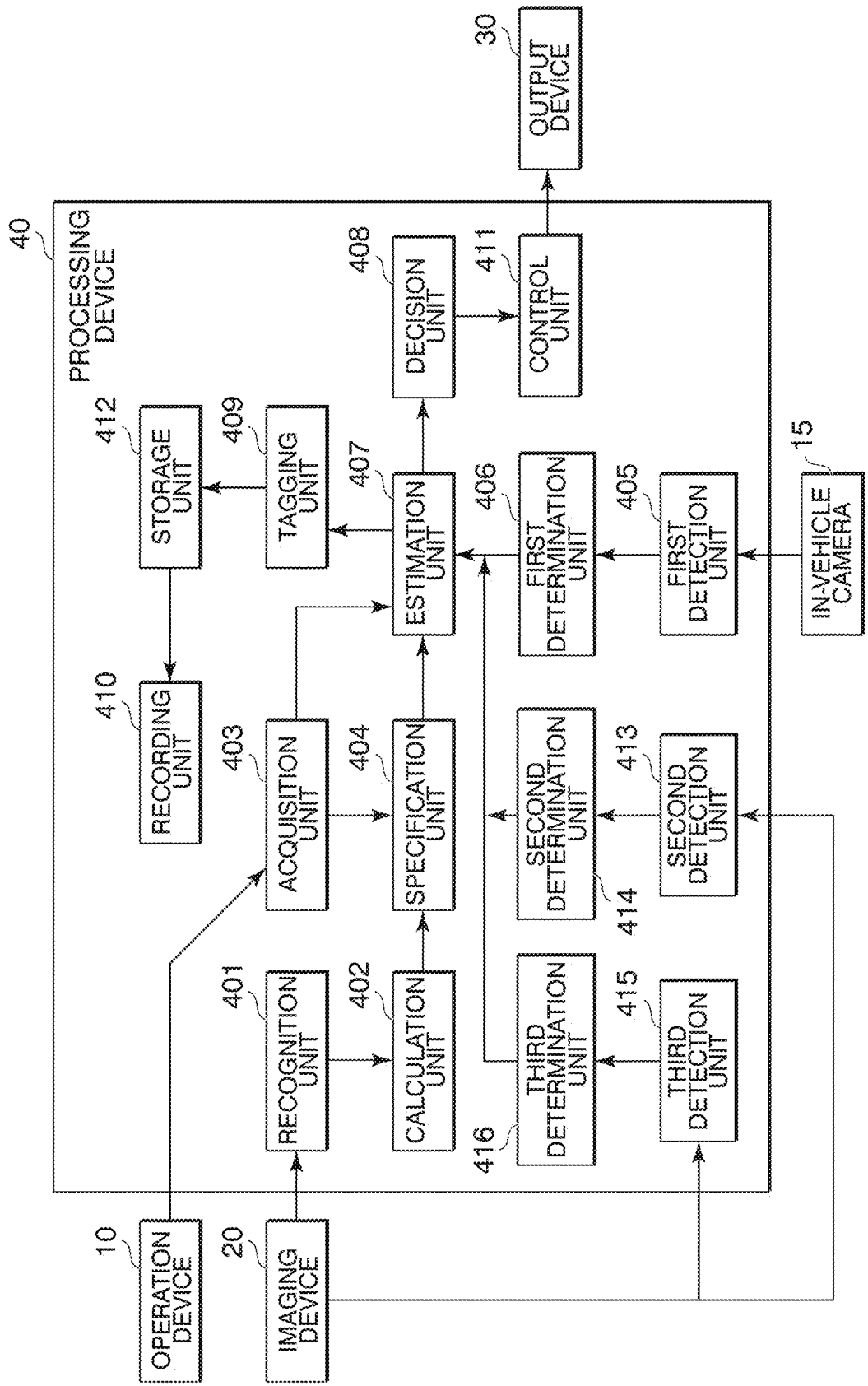
FIG. 10 is a diagram illustrating an example of a configuration of a processing device according to at least one embodiment of the present disclosure.

Further, in another embodiment of the present disclosure, as illustrated in FIG. 10, the processing device 40 may further include a second detection unit 413 and a second determination unit 414 in addition to the configuration of the processing device 40 in the third embodiment. The second detection unit 413 and the second determination unit 414 have the same functions as the second detection unit 413 and the second determination unit 414 according to the second embodiment.

The estimation unit 407 may estimate the degree of risk using a weight based on whether or not the driver recognizes a person, a weight based on whether or not the person recognizes the industrial vehicle 1, and a weight based on whether or not the person is in a movable state.

Therefore, the processing device 40 can notify the presence of an object around the industrial vehicle 1 in an aspect corresponding to not only the state of the driver of the industrial vehicle 1 but also the state of the person by detecting the posture of the person.

(Outline of Each Embodiment)

The outline of the first to third embodiments of the present disclosure described above will be described.

In the first embodiment of the present disclosure, the notification system has been described which notifies the driver of the presence of the object by outputting sounds of different aspects in the direction in which an object is present on the basis of whether or not the driver of the industrial vehicle 1 is aware of the object which may be an obstacle ("Embodiment 1" in FIG. 1).

In the second embodiment of the present disclosure, the notification system has been described in which the object is a person, and which notifies the driver of the presence of the object by outputting sounds of different aspects in the direction in which the object is present on the basis of whether or not the person is aware of the industrial vehicle 1 ("Embodiment 2-1" in FIG. 1). Further, in the second embodiment of the present disclosure, the notification system has been described which notifies the person of the presence of the industrial vehicle 1 by sound according to whether or not the person is aware of the presence of the industrial vehicle 1 ("Embodiment 2-2" in FIG. 1).

In the third embodiment of the present disclosure, the notification system has been described in which the object is a person, and which notifies the driver of the presence of the object by outputting sounds of different aspects in the direction in which the object is present on the basis of whether or not the person is in a movable state ("Embodiment 3-1" in FIG. 1). Further, in the third embodiment of the present disclosure, the notification system has been described in which the object is a person, and which notifies the person of the presence of the industrial vehicle by sound according to whether or not the person is in a movable state ("Embodiment 3-2" in FIG. 1).

In addition, in the first to third embodiments of the present disclosure, the configuration in which the imaging device 20 includes the first camera 20a, the second camera 20b, the third camera 20c, and the fourth camera 20d has been described. However, in another embodiment of the present disclosure, the imaging device 20 may capture the image of the entire periphery of the industrial vehicle 1 without creating a large blind spot, and the number of cameras included in the imaging device 20 and the position where the cameras are provided are not limited.

For example, the imaging device 20 may include one camera. In this case, for example, the one camera may be provided at the upper center of the industrial vehicle 1 and may capture the image of the entire periphery of the industrial vehicle 1 by being repeatedly rotated.

Further, the blind spots are likely to be too large in the four cameras illustrated in an embodiment of the present disclosure, depending on the size of the industrial vehicle 1 or the capturable image range of the cameras. In this case, for example, the imaging device 20 may further reduce the blind spot by including five or more cameras.

Further, in the first to third embodiments of the present disclosure, the configuration in which the output device 30 includes the first speaker 30*a*, the second speaker 30*b*, the third speaker 30*c*, and the fourth speaker 30*d* has been described. However, in another embodiment of the present disclosure, in a case in which an object is detected, the number of speakers and the position where the speakers are provided in the output device 30 are not limited as long as the speakers output sound from a direction or a region corresponding to the position of the object with respect to the industrial vehicle 1.

Furthermore, in the first to third embodiments of the present disclosure, the configuration in which the speaker controlled to output sound by the control unit 411 is a speaker that is oriented in the direction of the object with respect to the front surface of the industrial vehicle 1 has been described. However, in another embodiment of the present disclosure, the speaker controlled to output sound by the control unit 411 may be a speaker that is oriented in the direction of the object with respect to the orientation of the face of the driver of the industrial vehicle 1. That is, the control unit 411 may control the speaker such that the sound is heard from a direction that is rotated by the angle of the face of the driver from the direction in which the object is present.

The driver does not always face the front of the industrial vehicle 1. Therefore, for example, in a case in which the driver turns the face to the right side from the industrial vehicle 1, when sound is output from the left front speaker (the speaker 30*d* in FIGS. 1 and 2) of the industrial vehicle 1, sound is output from the speaker that is not in the field of view of the driver. In this case, for example, the driver may feel as if the sound is coming from the left rear side depending on the driver. Therefore, the driver is likely to mistakenly recognize that the object is present on the left rear side of the industrial vehicle 1 even though the actual object is present on the left front side of the industrial vehicle 1.

Therefore, in another embodiment of the present disclosure, in a case in which the object is present on the right front side of the industrial vehicle 1 with respect to the front of the industrial vehicle 1, the control unit 411 adjusts the phase of the sound output from the speakers 30*a*, 30*b*, 30*c*, and 30*d* such that the sound is heard from the right front side of the orientation of the face with respect to the orientation of the face of the driver of the industrial vehicle 1. Further, in a case in which the object is present on the right rear side of the industrial vehicle 1 with respect to the front of the industrial vehicle 1, the control unit 411 may adjust the phase of the sound output from the speakers 30*a*, 30*b*, 30*c*, and 30*d* such that the sound is heard from the right rear side of the orientation of the face with respect to the orientation of the face of the driver of the industrial vehicle 1. Furthermore, in a case in which the object is present on the left rear side of the industrial vehicle 1 with respect to the front of the industrial vehicle 1, the control unit 411 may adjust the phase of the sound output from the speakers 30*a*, 30*b*, 30*c*, and 30*d* such that the sound is heard from the left rear side of the orientation of the face with respect to the orientation of the face of the driver of the industrial vehicle 1. Moreover, in a case in which the object is present on the left front side of the industrial vehicle 1 with respect to the front of the industrial vehicle 1, the control unit 411 may adjust the phase of the sound output from the speakers 30*a*, 30*b*, 30*c*, and 30*d* such that the sound is heard from the left front side of the orientation of the face with respect to the orientation of the face of the driver of the industrial vehicle 1. For example, the control unit 411 may adjust the phase of the sound output from each speaker such that the sound is heard from the direction based on the orientation of the face of the driver of the industrial vehicle 1.

Further, for the process according to the embodiments of the present disclosure, the order of the process may be changed in the range in which the process is appropriately performed.

Each of the database 22, the storage unit 412, and the other storage devices in the embodiments of the present disclosure may be provided in any place in the range in which information is appropriately transmitted and received. In addition, a plurality of databases 22, a plurality of storage units 412, and a plurality of other storage devices may be provided in the range in which information is appropriately transmitted and received, and data may be distributed and stored in them.

The embodiments of the present disclosure have been described. However, the processing device 40 and other control devices may be provided with a computer system. In addition, the procedure of the above-mentioned process is stored in a non-transitory computer-readable recording medium in the form of a program, and the computer reads and executes the program to perform the above-mentioned process. A specific example of the computer is described below.

Figures 11, 12:
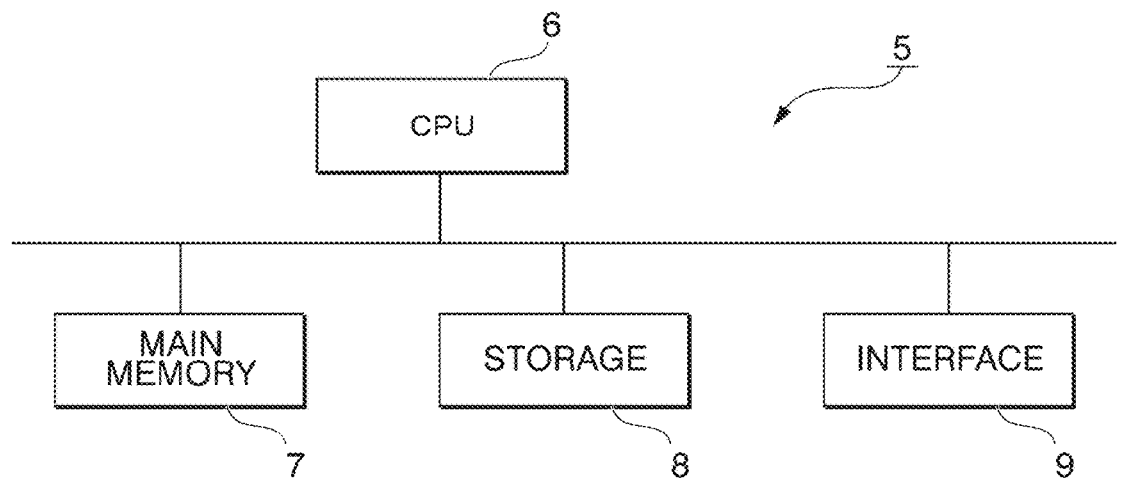
FIG. 11 is a schematic block diagram illustrating a configuration of a computer according to at least one embodiment of the present disclosure.
FIG. 12 is a diagram illustrating the outline of a notification system according to at least one embodiment of the present disclosure.

FIG. 11 is a schematic block diagram illustrating the configuration of a computer according to at least one of the embodiments.

As illustrated in FIG. 11, a computer 5 includes a CPU 6, a main memory 7, a storage 8, and an interface 9.

For example, each of the processing device 40 and other control devices is mounted on the computer 5. The operation of each of the above-mentioned processing units is stored in the storage 8 in the form of a program. The CPU 6 reads the program from the storage 8, develops the program onto the main memory 7, and executes the above-mentioned process according to the program. Further, the CPU 6 ensures storage areas corresponding to each of the above-mentioned storage units in the main memory 7 according to the program.

Examples of the storage 8 may include a hard disk drive (HDD), a solid state drive (SSD), a magnetic disk, a magneto-optical disk, a compact disc read only memory (CD-ROM), a digital versatile disc read only memory (DVD-ROM), a semiconductor memory, and the like. The storage 8 may be an internal medium that is directly connected to a bus of the computer 5 or may be an external medium that is connected to the computer 5 through the interface 9 or a communication line. In addition, when the program is delivered to the computer 5 by a communication line, the computer 5 having delivered the program may develop the program onto the main memory 7, and execute the processing described above. In at least one of the embodiments, the storage 8 is a non-transitory tangible storage medium.

In addition, the above-mentioned program may implement some of the above-mentioned functions. Further, the above-mentioned program may be a file that can implement the above-mentioned functions in combination with the program already recorded on the computer system, that is, a so-called difference file (difference program).

Furthermore, in another embodiment, each of the processing device 40 and other control devices may include a custom large scale integrated circuit (LSI), such as a programmable logic device (PLD), an application specific integrated circuit (ASIC), a graphics processing unit (GPU), and a processing device similar to them, in addition to or instead of the above-mentioned configuration. Examples of the PLD include a programmable array logic (PAL), a generic array logic (GAL), a complex programmable logic device (CPLD), and a field programmable gate array (FPGA). In this case, some or all of the functions implemented by the processing device may be implemented by the integrated circuit.

While preferred embodiments of the invention have been described and illustrated above, it should be understood that these are exemplary of the invention and are not to be considered as limiting. Additions, omissions, substitutions, and other modifications can be made without departing from the scope of the invention. Accordingly, the invention is not to be considered as being limited by the foregoing description and is only limited by the scope of the appended claims.

<Supplementary Notes>

For example, the processing device 40, the processing method, and the recording medium described in each embodiment of the present disclosure are understood as follows.

(1) According to a first aspect, there is provided a processing device (40) including: a calculation unit (402) that is configured to detect a position of an object that is a possible obstacle to a vehicle (1); a first detection unit (405) that is configured to detect a direction of a line of sight of a driver of the vehicle (1); a decision unit (408) that is configured to decide an aspect of an alarm on the basis of the position and the direction of the line of sight of the driver; and a control unit (411) that is configured to control a speaker corresponding to the position such that a sound of the aspect is output.

The processing device (40) makes it possible to notify the presence of a person or an object around the vehicle (1) in an aspect corresponding to the state of the driver of the vehicle (1).

(2) According to a second aspect, the processing device (40) according to (1) may further include a first determination unit (406) that is configured to determine whether or not the driver recognizes the object on the basis of the position and the direction of the line of sight of the driver. The control unit (411) directs the speaker (any of 30a, 30b, 30c, and 30d) to output a sound with a first volume in a case in which the first determination unit (406) determines that the driver does not recognize the object, and directs the speaker to output a sound with a second volume lower than the first volume in a case in which the first determination unit (406) determines that the driver recognizes the object.

The processing device (40) makes it possible to further clarify the content of the control of the control unit (411) and to clarify control for notifying the presence of a person or an object around the vehicle (1).

(3) According to a third aspect, in the processing device (40) according to (1) or (2), the object may be a person. The processing device (40) may further include a second detection unit (413) that is configured to detect a direction of a line of sight of the person. The decision unit (408) may decide the aspect on the basis of the direction of the line of sight of the person.

The processing device (40) makes it possible to notify the presence of a person or an object around the vehicle (1) in an aspect corresponding to the state of the person who is the object in addition to the state of the driver of the vehicle (1).

(4) According to a fourth aspect, the processing device (40) according to (3) may further include a second determination unit (414) that is configured to determine whether or not the person recognizes the vehicle on the basis of the direction of the line of sight of the person. The control unit (411) may direct the speaker (any of 30a, 30b, 30c, and 30d) to output a sound with a third volume in a case in which the second determination unit (414) determines that the person does not recognize the vehicle (1) and may direct the speaker (any of 30a, 30b, 30c, and 30d) to output a sound with a fourth volume lower than the third volume in a case in which the second determination unit (414) determines that the person recognizes the vehicle (1).

The processing device (40) makes it possible to further clarify the content of the control of the control unit (411) and to clarify control for notifying the presence of a person or an object around the vehicle (1).

(5) According to a fifth aspect, in the processing device (40) according to any one of (1) to (4), the second determination unit (414) may determine that the person does not recognize the vehicle (1) in a case in which the direction of the line of sight of the person is out of a range in which the vehicle (1) is recognizable by the person.

The processing device (40) makes it possible to appropriately determine whether or not the person recognizes the vehicle (1) on the basis of the direction of the line of sight of the person who is the object.

(6) According to a sixth aspect, in the processing device (40) according to any one of (1) to (5), the object may be a person. The processing device (40) may further include a third detection unit (415) that is configured to detect a posture of the person. The decision unit (408) may decide the aspect on the basis of the posture.

The processing device (40) makes it possible to notify the presence of a person or an object around the vehicle (1) in an aspect corresponding to the state of the person who is the object in addition to the state of the driver of the vehicle (1).

(7) According to a seventh aspect, the processing device (40) according to (5) may further include a third determination unit (416) that is configured to determine whether or not the person is in a movable state on the basis of the posture. The decision unit (408) may direct the speaker (any of 30a, 30b, 30c, and 30d) to output a sound with a fifth volume in a case in which the third determination unit (416) determines that the person is not in the movable state and may direct the speaker (any of 30a, 30b, 30c, and 30d) to output a sound with a sixth volume lower than the fifth volume in a case in which the third determination unit (416) determines that the person is in the movable state.

The processing device (40) makes it possible to further clarify the content of the control of the control unit (411) and to clarify control for notifying the presence of a person or an object around the vehicle (1).

(8) According to an eighth aspect, in the processing device (40) according to (7), the third detection unit (415) may acquire an image from which the posture of the person is detectable. The third determination unit (416) may input the image to a trained model to determine whether or not the person is in the movable state. The trained model may have learned parameters, using a learning data set including an image including a person and actual result information indicating an actual movement result of the person.

The processing device (40) makes it possible for the third determination unit (416) to determine whether or not the person is in the movable state on the basis of the actual result information.

(9) According to a ninth aspect, the processing device (40) according to any one of (1) to (8) may further include an estimation unit (407) that is configured to estimate a degree of risk related to the object on the basis of the position of the object detected by the calculation unit (402) and the direction of the line of sight detected by the first detection unit (405). The decision unit (408) may decide the aspect on the basis of the degree of risk. The control unit (411) may not output the alarm in a case in which the degree of risk is less than a threshold value.

The processing device (40) makes it possible to suppress the output of the alarm in a state in which a near miss accident does not occur even though an object has been detected. Therefore, it is possible to prevent the driver from being accustomed to the alarm due to an unnecessary alarm.

(10) According to a tenth aspect, the processing device (40) according to any one of (1) to (9) may further include a specification unit (404) that is configured to specify a first state in which the vehicle and the object come into contact with each other on the basis of the position of the object detected by the calculation unit (402). The estimation unit (407) may estimate the degree of risk on the basis of the position of the object detected by the calculation unit (402), the direction of the line of sight detected by the first detection unit (405), and the distance between the first state and a second state which is the state of the vehicle when the position of the object is detected.

The processing device (40) makes it possible to comprehensively calculate the degree of risk not only from the recognition of the driver but also from the state of the object and the vehicle and to determine whether or not to output an alarm.

(11) According to an eleventh aspect, in the processing device (40) according to any one of (1) to (10), the control unit (411) may control the speaker such that the driver hears the sound from a direction obtained by rotating a direction related to the position of the object by an angle of a face of the driver.

The processing device (40) makes it possible to appropriately inform the driver in which direction the object is present even in a case in which the driver is not facing the front.

(12) According to a twelfth aspect, there is provided a processing method including: detecting a position of an object that is a possible obstacle to a vehicle (1); detecting a direction of a line of sight of a driver of the vehicle (1); deciding an aspect of an alarm on the basis of the position and the direction of the line of sight of the driver; and controlling a speaker corresponding to the position such that a sound of the aspect is output.

This processing method makes it possible to notify the presence of a person or an object around the vehicle (1) in an aspect corresponding to the state of the driver of the vehicle (1).

(13) According to a thirteenth aspect, there is provided a recording medium that is configured to cause a computer to perform: detecting a position of an object that is a possible obstacle to a vehicle (1); detecting a direction of a line of sight of a driver of the vehicle (1); deciding an aspect of an alarm on the basis of the position and the direction of the line of sight of the driver; and controlling a speaker corresponding to the position such that a sound of the aspect is output.

This recording medium makes it possible to notify the presence of a person or an object around the vehicle (1) in an aspect corresponding to the state of the driver of the vehicle (1).

What is claimed is:

1. A processing device comprising:
a memory configured to store instructions; and
a processor configured to execute the instructions to:
detect a position of a person who is a possible obstacle to a vehicle;
detect a direction of a line of sight of a driver of the vehicle;
decide an aspect of an alarm on the basis of the position and the direction of the line of sight of the driver; and
control a speaker corresponding to the position such that a sound of the aspect is output;
wherein the processor is configured to:
detect a posture of the person;
determine whether or not the person is in a movable state on the basis of the posture;
decide the aspect as an aspect of a fifth volume in a case in which the processor determines that the person is not in the movable state; and
decide the aspect as an aspect of a sixth volume lower than the fifth volume in a case in which the processor determines that the person is in the movable state.

2. The processing device according to claim 1,
wherein the processor is configured to:
determine whether or not the driver recognizes the person on the basis of the position and the direction of the line of sight of the driver; and
decide the aspect as an aspect of a first volume in a case in which the processor determines that the driver does not recognize the person, and decide the aspect as an aspect of a second volume lower than the first volume in a case in which the processor determines that the driver recognizes the person.

3. The processing device according to claim 1,
wherein the processor is configured to:
detect a direction of a line of sight of the person; and
decide the aspect on the basis of the direction of the line of sight of the person.

4. The processing device according to claim 3,
wherein the processor is configured to:
determine whether or not the person recognizes the vehicle on the basis of the direction of the line of sight of the person; and
decide the aspect as an aspect of a third volume in a case in which the processor determines that the person does not recognize the vehicle, and decide the aspect as an aspect of a fourth volume lower than the third volume in a case in which the processor determines that the person recognizes the vehicle.

5. The processing device according to claim 4,
wherein the processor is configured to determine that the person does not recognize the vehicle in a case in which the direction of the line of sight of the person is out of a range in which the vehicle is recognizable by the person.

6. The processing device according to claim 1,
wherein the processor is configured to acquires an image from which the posture of the person is detectable, and determine whether or not the person is in the movable state by inputting the image to a trained model; and the trained model has learned parameters, using a learning data set including an image including a person and actual result information indicating an actual movement result of the person.

7. The processing device according to claim 1, wherein the processor is configured to:
   estimate a degree of risk related to the person on the basis of the position of the person detected by the processor and the direction of the line of sight detected by the processor; and
   decide the aspect on the basis of the degree of risk,
   wherein the processor is configured not to output the alarm in a case in which the degree of risk is less than a threshold value.

8. The processing device according to claim 7, wherein the processor is configured to:
   specify a first state in which the vehicle and the person are able to come into contact with each other on the basis of the position of the person detected by the processor; and
   estimate the degree of risk on the basis of the position of the person detected by the processor, the direction of the line of sight detected by the processor, and a distance between the first state and a second state which is a state of the vehicle when the position of the person is detected.

9. The processing device according to claim 1, wherein the processor is configured to control the speaker such that the driver hears the sound from a direction obtained by rotating a direction related to the position of the person by an angle of a face of the driver.

10. A notification system comprising:
    the processing device according to claim 1; and
    the vehicle.

11. A processing method comprising:
    detecting a position of a person who is a possible obstacle to a vehicle;
    detecting a direction of a line of sight of a driver of the vehicle;
    deciding an aspect of an alarm on the basis of the position and the direction of the line of sight of the driver; and
    controlling a speaker corresponding to the position such that a sound of the aspect is output;
    wherein the processing method comprises:
        detecting a posture of the person;
        determining whether or not the person is in a movable state on the basis of the posture;
        deciding the aspect as an aspect of a fifth volume in a case in which the processor determines that the person is not in the movable state; and
        deciding the aspect as an aspect of a sixth volume lower than the fifth volume in a case in which the processor determines that the person is in the movable state.

12. A non-transitory computer-readable recording medium storing a program that causes a computer to execute:
    detecting a position of a person who is a possible obstacle to a vehicle;
    detecting a direction of a line of sight of a driver of the vehicle;
    deciding an aspect of an alarm on the basis of the position and the direction of the line of sight of the driver; and
    controlling a speaker corresponding to the position such that a sound of the aspect is output;
    wherein the program causes the computer to execute:
        detecting a posture of the person;
        determining whether or not the person is in a movable state on the basis of the posture;
        deciding the aspect as an aspect of a fifth volume in a case in which the processor determines that the person is not in the movable state; and
        deciding the aspect as an aspect of a sixth volume lower than the fifth volume in a case in which the processor determines that the person is in the movable state.

* * * * *